(12) United States Patent
An et al.

(10) Patent No.: US 10,409,374 B2
(45) Date of Patent: Sep. 10, 2019

(54) WEARABLE DEVICE AND METHOD FOR PROVIDING FEEDBACK OF WEARABLE DEVICE

(71) Applicant: Samsung Electronics Co., Ltd., Suwon-si, Gyeonggi-do (KR)

(72) Inventors: Kwang-dek An, Hwaseong-si (KR); Seo-young Yoon, Suwon-si (KR); Moon-sik Jeong, Seongnam-si (KR); Bo-seok Moon, Gunpo-si (KR); Young-eun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/572,694

(22) PCT Filed: Mar. 7, 2016

(86) PCT No.: PCT/KR2016/002238
§ 371 (c)(1),
(2) Date: Nov. 8, 2017

(87) PCT Pub. No.: WO2016/182181
PCT Pub. Date: Nov. 17, 2016

(65) Prior Publication Data
US 2018/0143686 A1    May 24, 2018

(30) Foreign Application Priority Data
May 12, 2015 (KR) .................... 10-2015-0066247

(51) Int. Cl.
*G06F 3/01* (2006.01)
*G06F 1/16* (2006.01)

(52) U.S. Cl.
CPC .............. *G06F 3/016* (2013.01); *G06F 1/163* (2013.01); *G06F 3/011* (2013.01); *G06F 3/015* (2013.01); *G06F 3/017* (2013.01)

(58) Field of Classification Search
CPC .......... G06F 3/016; G06F 3/011; G06F 3/017; G06F 1/163; G06F 3/015; G06F 3/044
See application file for complete search history.

(56) References Cited

U.S. PATENT DOCUMENTS

| 8,170,656 | B2 | 5/2012 | Tan et al. | |
| 2004/0024312 | A1* | 2/2004 | Zheng | A61B 5/1038 600/437 |
| 2010/0102941 | A1* | 4/2010 | Richter | G06F 1/1626 340/407.2 |
| 2010/0261146 | A1 | 10/2010 | Kim | |

(Continued)

FOREIGN PATENT DOCUMENTS

| EP | 1 721 572 A1 | 11/2006 |
| KR | 10-2009-0105785 A | 10/2009 |

(Continued)

*Primary Examiner* — Premal R Patel
(74) *Attorney, Agent, or Firm* — Jefferson IP Law, LLP

(57) ABSTRACT

A method performed by a wearable device to provide feedback includes detecting a user motion; determining, based on the detected user motion, a body part to which a feedback signal is to be transmitted; generating the feedback signal; and outputting the feedback signal, wherein the feedback signal is an electrical signal to stimulate muscles of the body part.

20 Claims, 26 Drawing Sheets

(56) References Cited

U.S. PATENT DOCUMENTS

| | | |
|---|---|---|
| 2011/0006926 A1 | 1/2011 | Kim et al. |
| 2012/0188158 A1 | 7/2012 | Tan et al. |
| 2012/0269240 A1* | 10/2012 | Balteanu ............... H03F 1/0227 375/219 |
| 2013/0131757 A1* | 5/2013 | Duncan ............... A61N 1/36003 607/49 |
| 2013/0261515 A1 | 10/2013 | Choi et al. |
| 2013/0271412 A1* | 10/2013 | Adachi .................. G06F 3/016 345/173 |
| 2014/0024981 A1 | 1/2014 | Chun et al. |
| 2014/0135960 A1 | 5/2014 | Choi |
| 2014/0198034 A1 | 7/2014 | Bailey et al. |
| 2014/0243710 A1 | 8/2014 | Jeong |
| 2016/0015972 A1* | 1/2016 | Hyde ..................... H02J 7/025 607/48 |

FOREIGN PATENT DOCUMENTS

| | | |
|---|---|---|
| KR | 10-2010-0040530 A | 4/2010 |
| KR | 10-2012-0131342 A | 12/2012 |
| KR | 10-2013-0110441 A | 10/2013 |
| KR | 10-2013-0112121 A | 10/2013 |
| KR | 10-2014-0013335 A | 2/2014 |
| KR | 10-2014-0062892 A | 5/2014 |
| KR | 10-2014-0107062 A | 9/2014 |
| WO | 2009-123396 A2 | 10/2009 |

* cited by examiner

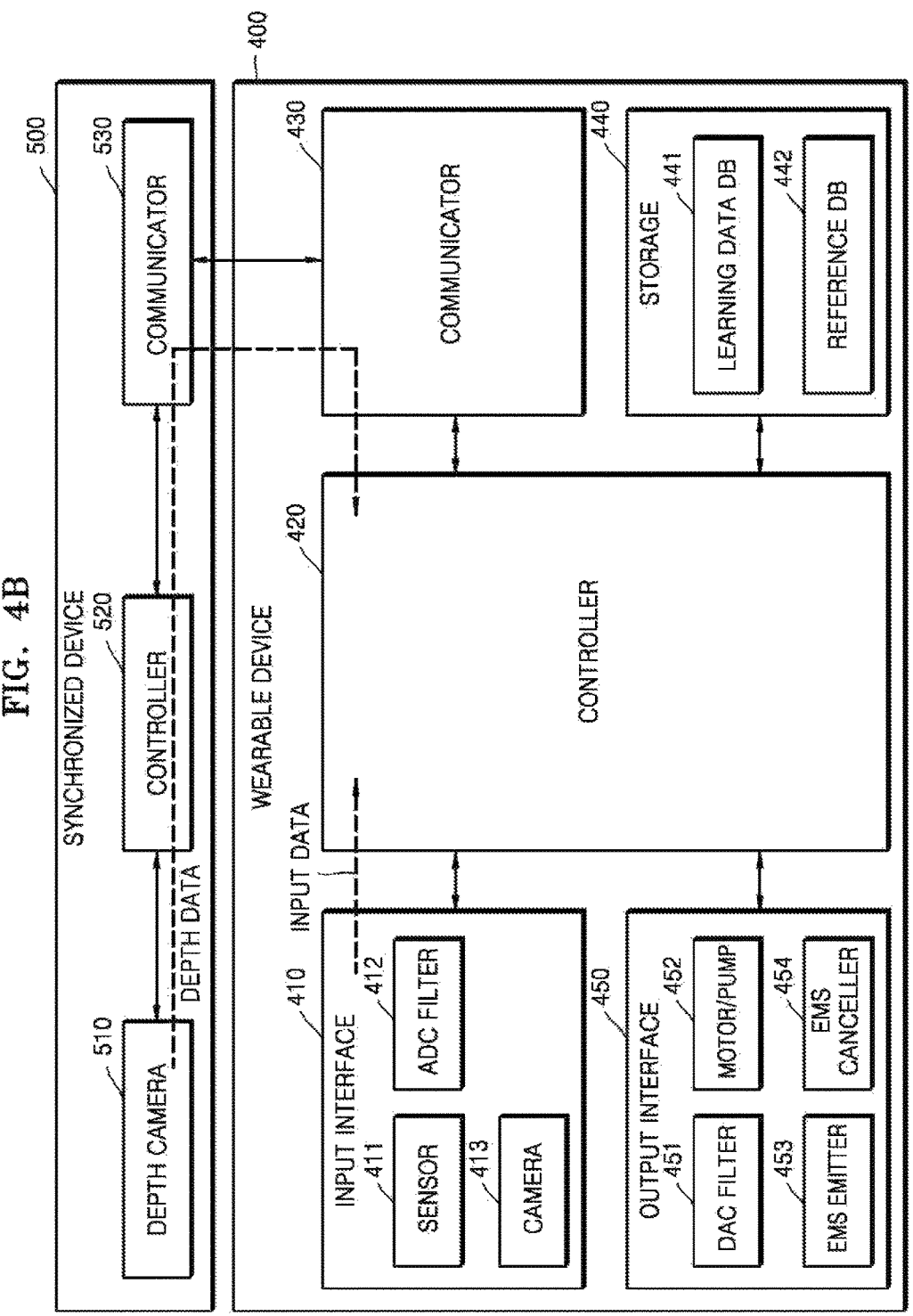

FIG. 5
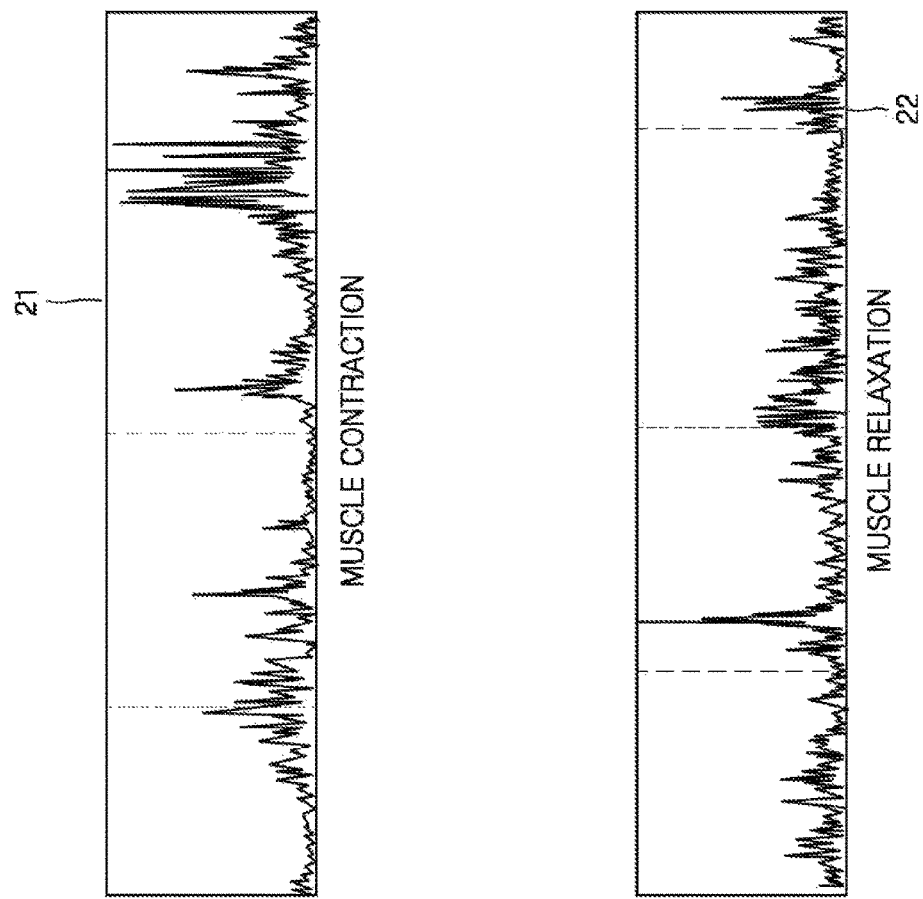
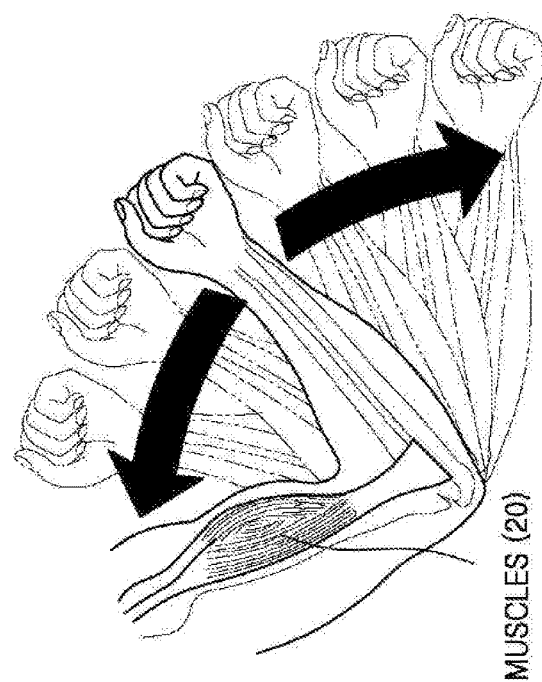

<TRANSMIT FEEDBACK SIGNAL TO MUSCLES REALATED TO MOTION OF THUMB>

<TRANSMIT FEEDBACK SIGNAL TO MUSCLES
REALATED TO MOTION OF INDEX FINGER>

<TRANSMIT FEEDBACK SIGNAL TO MUSCLES REALATED
TO MOTION OF MIDDLE FINGER>

<TRANSMIT FEEDBACK SIGNAL TO MUSCLES REALATED TO MOTION OF LITTLE FINGER>

WEARABLE DEVICE AND METHOD FOR PROVIDING FEEDBACK OF WEARABLE DEVICE

TECHNICAL FIELD

The present inventive concept relates to a wearable device and a method of providing feedback via the wearable device.

BACKGROUND ART

In human-computer interaction (HCI), traditionally devices, such as a keyboard, a mouse, etc., have been used by a user to perform an input operation. Recently, an input operation may be performed by recognizing a user motion by mapping a virtual user interface (UI) on a space.

An electronic apparatus may provide feedback to a user with respect to results of an input process as described above and specific processing operations. The electronic apparatus may provide feedback regarding completion of the input operation or feedback regarding a specific result to the user by generating vibration or sounds or by displaying specific graphic elements on a screen display.

DETAILED DESCRIPTION OF THE DISCLOSURE

Technical Problem

Embodiments disclosed herein relate to a feedback apparatus configured to improve the perception of reality by simulating a physical feeling via a method and an apparatus for transmitting a feedback signal to a body part corresponding to a user motion.

Technical Solution

Provided is a method performed by a wearable device to provide feedback, the method including: detecting a user motion; determining, based on the detected user motion, a body part to which a feedback signal is to be transmitted; generating the feedback signal; and outputting the feedback signal, wherein the feedback signal is an electrical signal to stimulate muscles of the body part.

Provided is a wearable device including: an electrode pad located on a body of a user; an input interface configured to detect a motion of the user; a controller configured to determine, based on the detected motion of the user, a body part to which a feedback signal is to be transmitted; and an output interface configured to output the feedback signal via the electrode pad located on the body part, wherein the feedback signal is an electrical signal to stimulate muscles of the body part.

DESCRIPTION OF THE DRAWING

FIG. 4B is a block diagram for describing a method of detecting a user motion by using depth data and an electromyographic (EMG) signal.

FIG. 5 is a view for describing an example of an EMG signal generated during contraction and relaxation of muscles.

BEST MODE

According to an aspect of the present inventive concept, there is provided a method performed by a wearable device to provide feedback, the method including: detecting a user motion; determining, based on the detected user motion, a body part to which a feedback signal is to be transmitted; generating the feedback signal; and outputting the feedback signal, wherein the feedback signal is an electrical signal to stimulate muscles of the body part.

According to another aspect of the present inventive concept, there is provided a wearable device including: an electrode pad located on a body of a user; an input interface configured to detect a motion of the user; a controller configured to determine, based on the detected motion of the user, a body part to which a feedback signal is to be transmitted; and an output interface configured to output the feedback signal via the electrode pad located on the body part, wherein the feedback signal is an electrical signal to stimulate muscles of the body part.

Mode of the Disclosure

Figure 1:
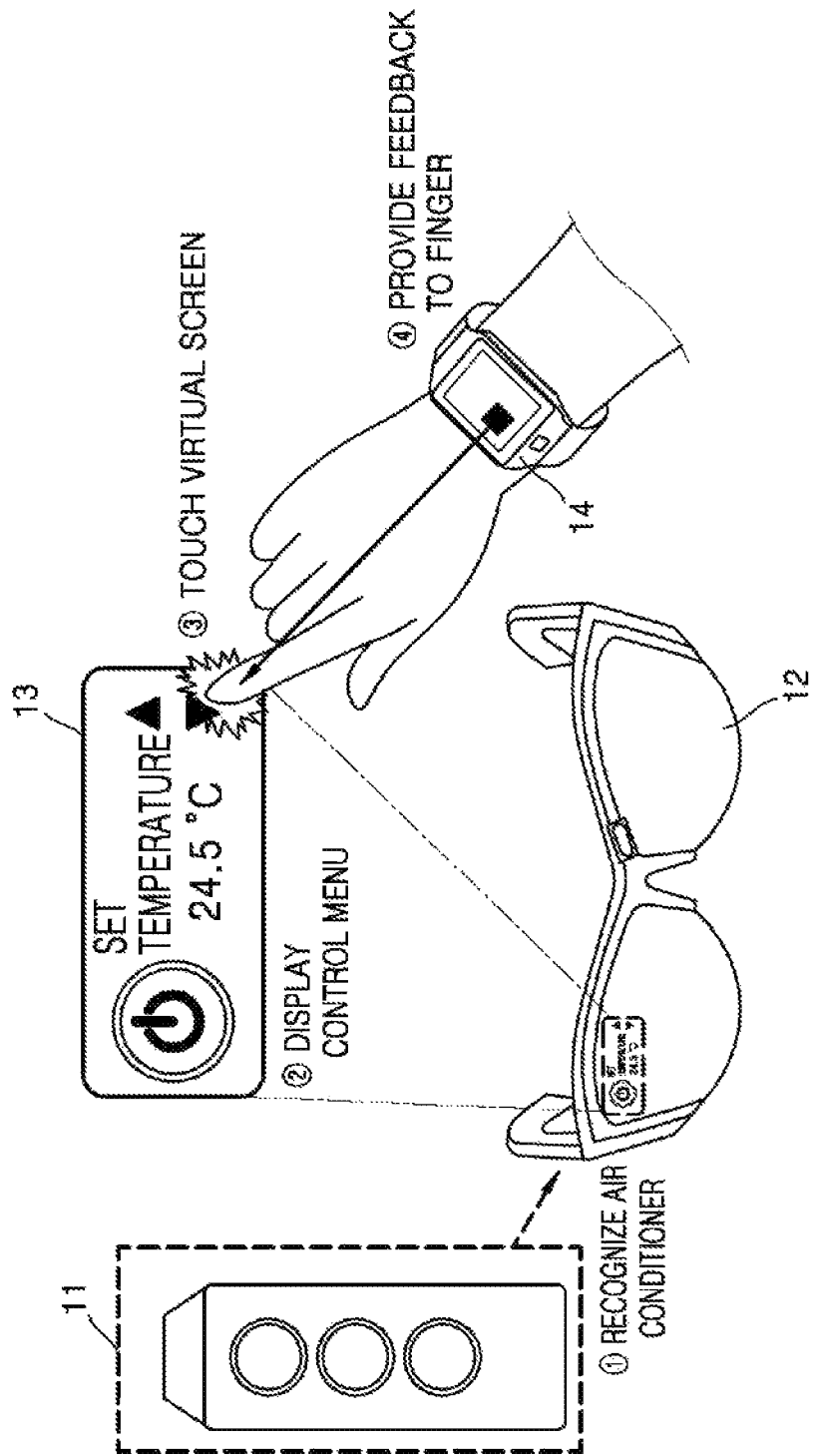
FIG. 1 is a schematic view for describing a method of transmitting a feedback signal, according to an embodiment.

FIG. 1 is a schematic view for describing a method of transmitting a feedback signal, according to an embodiment. Referring to FIG. 1, a wearable device 14 may detect a body part of a user that performed a space input operation and may transmit a feedback signal to the detected body part.

Smart glasses 12 may detect an air conditioner 11. The smart glasses 12 may detect an electronic apparatus that a user wants to control by tracking the user's eyes.

The smart glasses 12 may display a control menu 13 configured to control the air conditioner 11. For example, the smart glasses 12 may display the control menu 13 configured to set temperatures of the air conditioner 11. The smart glasses 12 may display the control menu 13 in a virtual space. Thus, the user wearing the smart glasses 12 may see the control menu 13 via the smart glasses 12.

The user may touch a virtual screen. The user may touch the virtual screen via the smart glasses 12 to perform an input operation. For example, the user may increase or decrease the temperature of the air conditioner 11 by touching a button displayed on a virtual screen.

The smart glasses 12 may control the air conditioner 11 according to a user input. The smart glasses 12 may detect a user motion used in the input operation and may recognize the user motion as a control signal to increase or decrease the temperature of the air conditioner 11.

The wearable device 14 may provide a feedback signal to the user. The wearable device 14 may receive the user motion from the smart glasses 12 and transmit the feedback signal to a body part of the user based on the user motion. The feedback signal may be an electrical signal to stimulate muscles of the body part. For example, when the user has touched the virtual screen by an index finger, the smart glasses 12 may detect the index finger of the user, may detect an event in which the index finger approaches a specific user interface (UI) of the virtual screen by extracting a depth value, and may transmit the detected event and the depth value to the wearable device 14 as a detection result. Based on the transmitted data, the wearable device 14 may transmit the electrical signal to muscles or a muscle fascicle connected to the index finger of the user. The wearable device 14 may transmit electrical muscle stimulation to the muscles or the fasciculus muscular so as to provide the user via a repellant force of a musculoskeletal system with physical feedback that the user has accessed a virtual menu.

When a user performs an input operation via a motion or a gesture in the virtual space, the user may physically recognize the input operation, even if the user has not actually physically made contact with the space. Thus, for the motion or the gesture of the user, the wearable device 14 may provide the user with physical feedback regarding completion of the input operation or physical feedback such as a depth experience.

Figure 2:
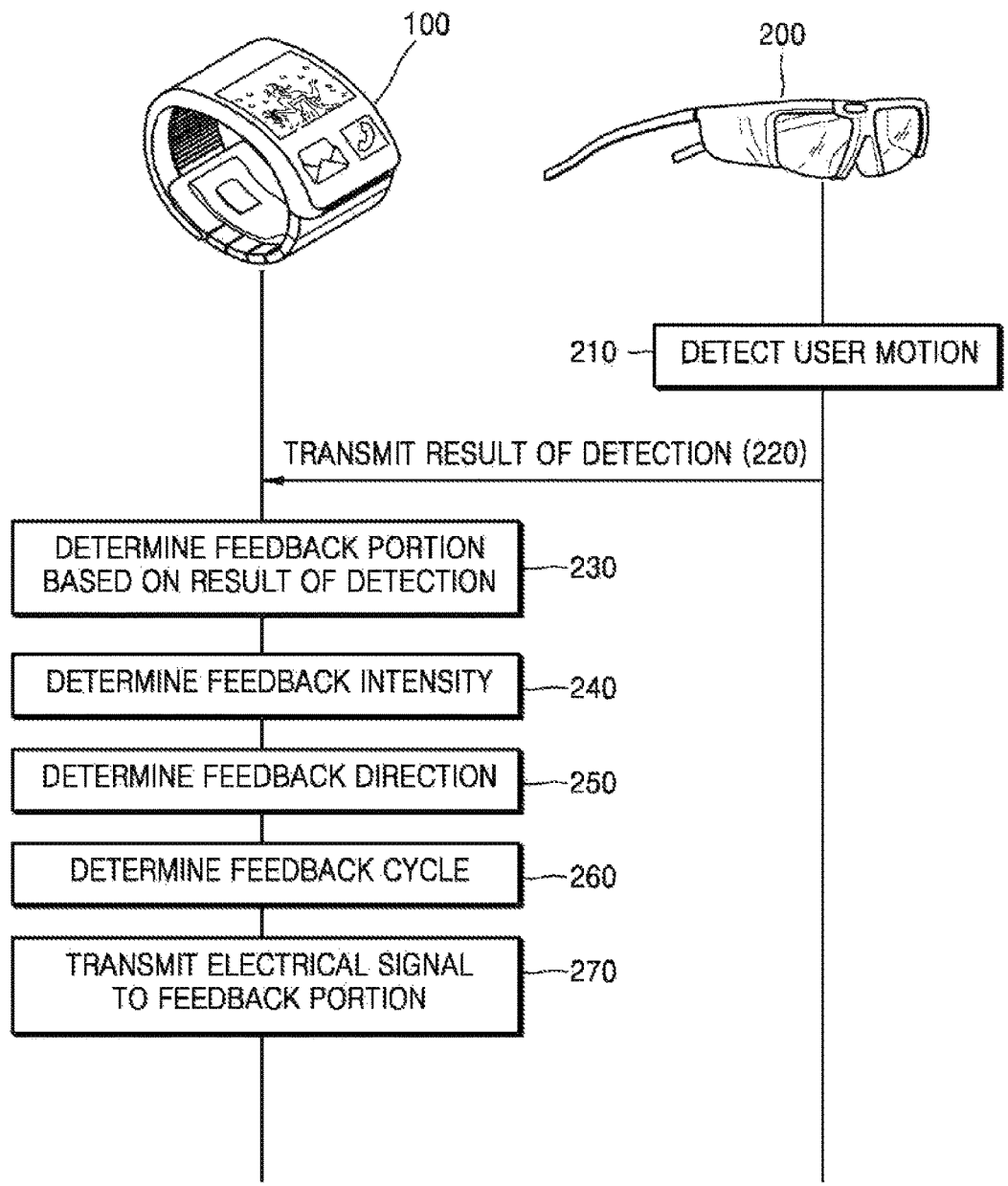
FIG. 2 is a flowchart of a method of providing feedback, according to an embodiment.

FIG. 2 is a flowchart of a method of providing feedback, according to an embodiment. Referring to FIG. 2, a wearable device 100 may transmit an electrical signal to a feedback portion based on a user motion received from an electronic apparatus 200.

In operation S210, the electronic apparatus 200 may detect the user motion. The electronic apparatus 200 may detect the user motion by using a camera, a depth camera, an infrared sensor, an ultrasonic sensor, a motion sensor, or the like. For example, the electronic apparatus 200 may detect which finger the user has used to perform a space input operation, which movement the user is doing, etc.

In operation S220, the electronic apparatus 200 may transmit a result of the detection to the wearable device 100.

In operation S230, the wearable device 100 may determine the feedback portion based on the result of the detection. The feedback portion denotes a part of a human body of the user. For example, the feedback portion may include a finger, a fingertip, a neck, a back, a knee, etc. of the user, which was used in the input operation. The wearable device 100 may determine based on the user motion a part of the body of the user to which a feedback signal is to be transmitted. The wearable device 100 may determine the feedback portion based on the result of the detection received from the electronic apparatus 200 and a surface electromyographic signal (hereinafter, an sEMG signal) that is measured.

In operation S240, the wearable device 100 may determine a feedback intensity. The feedback intensity refers to a magnitude of an electrical signal transmitted by the wearable device 100 to the user. The wearable device 100 may differently set the feedback intensity based on a user, an external environment, such as a current temperature, humidity, etc., a user setting, or a learning result. Also, the wearable device 100 may set the feedback intensity by taking into account at least two of the user, the external environment, such as the current temperature, humidity, etc., the user setting, and the learning result.

In operation S250, the wearable device 100 may determine a feedback direction. The feedback direction refers to a direction in which the electrical signal is transmitted to the user by the wearable device 100. The wearable device 100 may sequentially transmit electrical signals to a plurality of body parts. The feedback direction refers to directions of the electrical signals sequentially output. The wearable device 100 may differently set the feedback direction based on the user, the external environment, such as the current temperature, humidity, etc., the user setting, or the learning result. Also, the wearable device 100 may set the feedback direction by taking into account at least two of the user, the external environment, such as the current temperature, humidity, etc., the user setting, and the learning result.

In operation S260, the wearable device 100 may determine a feedback cycle. The feedback cycle may refer to a time interval at which the wearable device 100 outputs the feedback signal. Alternatively, the feedback cycle may refer to a pattern in which the wearable device 100 outputs the feedback signal. The wearable device 100 may differently set the feedback cycle based on the user, the external environment, such as the current temperature, humidity, etc., the user setting, or the learning result. Also, the wearable device 100 may set the feedback cycle by taking into account at least two of the user, the external environment, such as the current temperature, humidity, etc., the user setting, and the learning result.

In operation S270, the wearable device 100 may transmit the electrical signal to the feedback portion. For example, the wearable device 100 may generate an electrical muscle stimulus signal and emit the electrical muscle stimulus signal via an electrode pad. The electrode pad may be located on or attached to the body of the user. The wearable device 100 may transmit the feedback signal to the user based on the methods determined in operations S230 through S260. In other words, the wearable device 100 may transmit the feedback signal to the determined feedback portion based on the intensity, the direction, and the cycle that are determined.

According to the present embodiment, the feedback portion is determined (S230), the feedback intensity is determined (S240), the feedback direction is determined (S250), and the feedback cycle is determined (S260), in this stated order. However, the order of operations S230 through S260 may be changed, and according to cases, operations S230 through S260 may be simultaneously performed.

Figure 3:
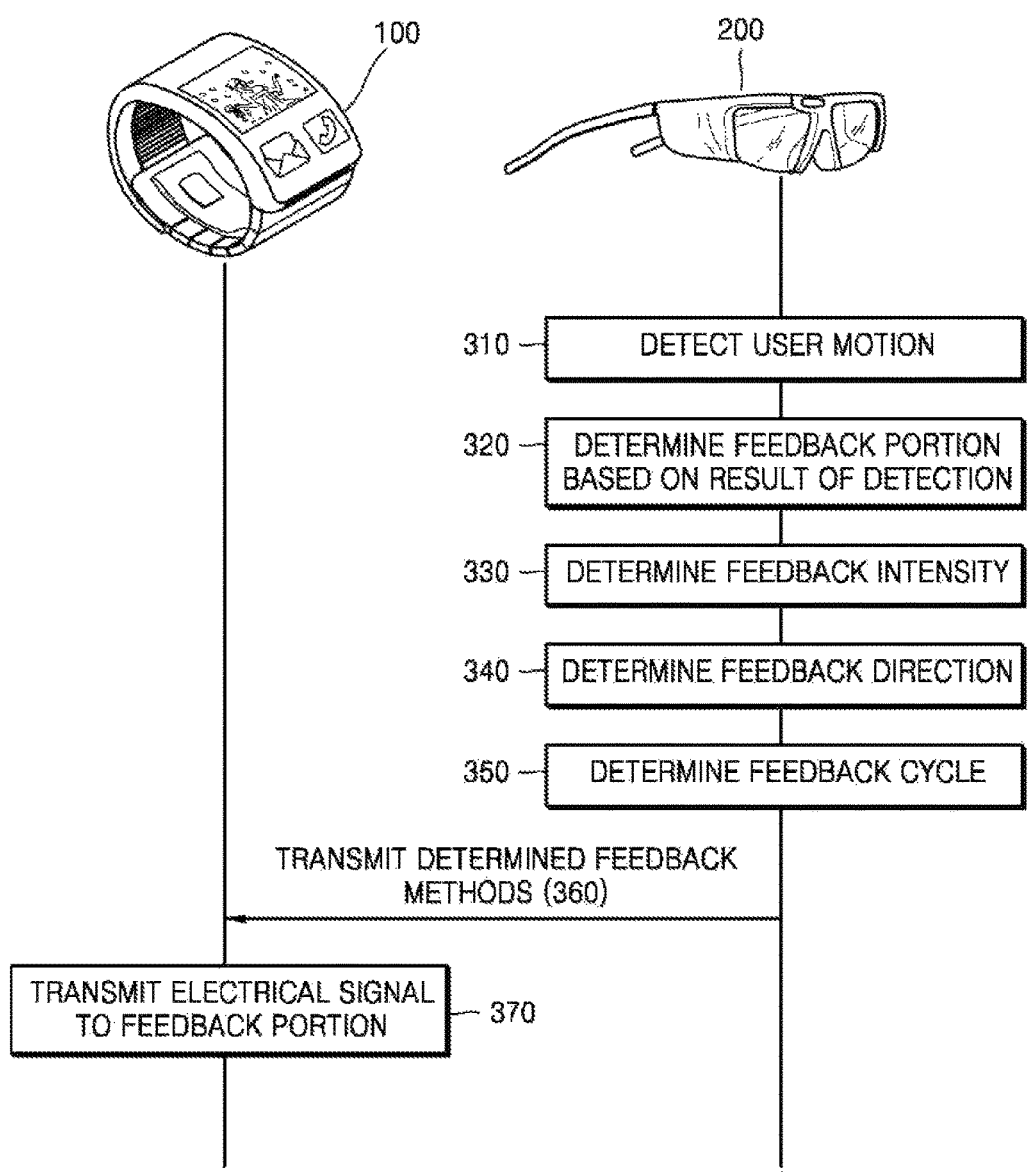
FIG. 3 is a flowchart of a method of providing feedback, according to an embodiment.

FIG. 3 is a flowchart of a method of providing feedback, according to an embodiment. Referring to FIG. 3, the wearable device 100 may output an electrical signal based on a result of the determined feedback methods, received from the electronic apparatus 200.

According to the flowchart illustrated in FIG. 2, the wearable device 100 determines all of the feedback methods. However, according to the flowchart illustrated in FIG. 3, the electronic apparatus 200 may determine the feedback methods and transmit the determined feedback methods to the wearable device 100. Thus, in operation S370, the wearable device 100 may output the electrical signal based on the received feedback methods.

Operations S310 through S360 of FIG. 3 are the same as operations S210 through S260. However, operations S310 through S360 are performed by the electronic apparatus 200.

When the wearable device 100 includes only an electrical signal generator, the electronic apparatus 200, rather than the wearable device 100, may determine the feedback methods. Accordingly, the wearable device 100 may be manufactured to have a simple structure.

Figure 4A:
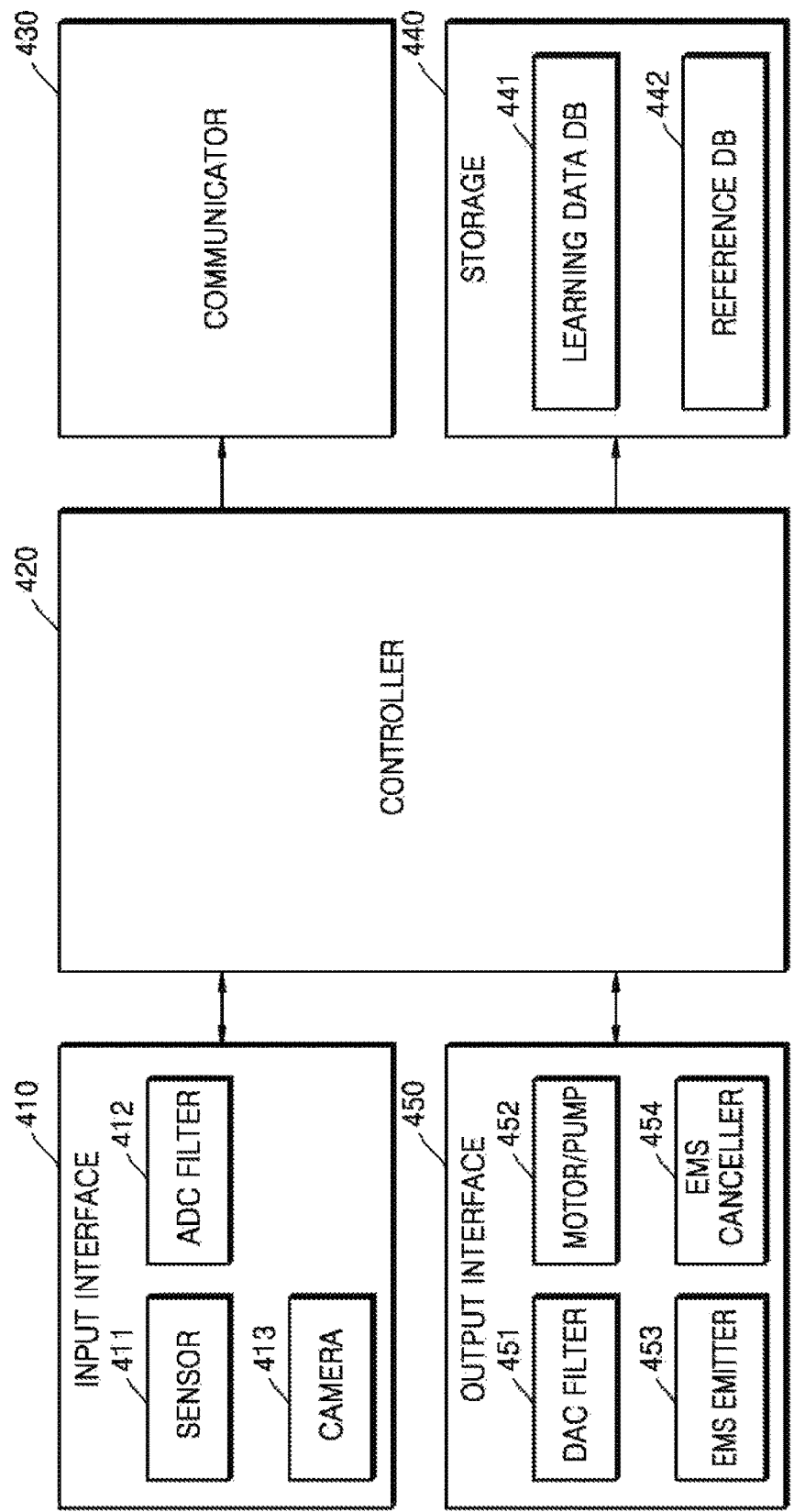
FIG. 4A is a block diagram of a wearable device according to an embodiment.

FIG. 4A is a block diagram of a wearable device 400 according to an embodiment. Referring to FIG. 4A, the wearable device 400 may include an input interface 410, a controller 420, a communicator 430, a storage 440, and an output interface 450.

The input interface 410 may detect a user motion. The input interface 410 may detect the user motion by measuring an sEMG signal generated from muscles of a user. Also, the input interface 410 may detect the user motion by photographing the user motion. Also, the input interface 410 may detect the user motion by using various sensors.

The input interface 410 may include a sensor 411, an analog-digital conversion (ADC) filter 412, and a camera 413. The sensor 411 may include a temperature sensor, a humidity sensor, an EMG signal measuring device, or the like. The EMG signal measuring device may include a conductive electrode, an inductive electrode, or the like, and may measure an electrical signal generated from muscles of the user.

The ADC filter 412 may extract only an activation signal of the muscles of the user from signals received from the conductive electrode or the inductive electrode, and may convert the extracted activation signal to a digital signal.

The camera 413 may photograph the user and output a photographed image to the controller 420. For example, the camera 413 may be a depth camera, and the depth camera may obtain depth information of the user. Thus, the input interface 410 may compare changes in depth values received from the depth camera, extract an outline of the user, and track a change in motions of the user.

The input interface 410 may further include a sensor configured to track a wearing position of the wearable device 400. For example, the input interface 410 may further include an acceleration sensor, a gyro sensor, a motion sensor, an EMG sensor, an infrared sensor, an ultrasonic sensor, or the like, and may detect the user motion by using these sensors.

The input interface 410 may detect the user motion by using signals received from at least two sensors. For example, the input interface 410 may detect an overall motion of the user by using the image photographed by the camera 413 and a detailed motion of the user by using data detected by the EMG sensor.

The wearing position of the wearable device 400 may be changed over time. Thus, the input interface 410 may track the wearing position of the wearable device 400 by using various sensors and output a result of the tracking to the controller 420.

The controller 420 may operate and control a signal processing module, an electrode selection module, a signal generation module, a learning module, a wearing position determination module, and a ground control module. The signal processing module, the electrode selection module, the signal generation module, the learning module, the wearing position determination module, and the ground control module may be stored in the storage 440. The controller 420 may output a feedback signal to the user by controlling the output interface 450, based on signals received from the input interface 410.

The controller 420 may not only output the feedback signal based on the user motion, but may also track a change in the tension of the muscles of the user and use the change in the tension as an input. The change in the tension of the muscles may be measured via the measured sEMG signal. For example, the user may obtain an object in a virtual way, via a gesture of holding, by a hand, an object displayed on a virtual space. Thereafter, when the controller 420 senses an increase in the tension of the muscles, even though there is no change in the gesture of the user, the controller 420 may determine that the user applies grasping power to the object and may execute an event related to applying the grasping power to the virtual object. Accordingly, the controller 420 may detect an intention of the user based on the sEMG signal and may process an event based on the intention of the user, thereby performing interaction with the user.

The controller 420 may determine feedback methods based on the signals received from the input interface 410. The signal processing module may determine a body part to which the feedback signal is to be transmitted, and an intensity, a direction, and a cycle of the feedback signal.

The controller 420 may select an electrode to which the feedback signal is to be output based on the determined feedback methods. The electrode selection module may select at least one electrode or a group of electrodes. The electrode selection module may select an electrode pad which is to be turned on or off, or select an electrode which is to be turned on or off.

The signal generation module may generate the feedback signal via a predefined algorithm and a reference value. Also, the signal generation module may dynamically change the feedback signal based on a value calculated via the learning module.

The learning module may calculate the intensity, the direction, the cycle, etc. of the feedback signal that are appropriate for the user, based on the user motion received via the input interface 410 or the communicator 430, and data received from a reference database (DB) 442. The learning module may transmit data, such as the calculated intensity, direction, cycle, etc., to the signal processing module.

The wearing position determination module may track a wearing position of the wearable device 400 and determine a current wearing position. The wearing position determination module may control devices configured to prevent a change in the wearing position.

The ground control module may prevent an electrical muscle stimulation (EMS) signal from being emitted to unintended body parts. The ground control module may maintain a ground state around electrodes to which the EMS signal is emitted. The ground control module may maintain the ground state around the electrodes to which the EMS signal is emitted, by outputting a signal to ground electrodes around the electrodes to which the EMS signal is emitted.

The ground control module may control on/off states of the ground electrodes by outputting a signal to the ground electrodes.

The communicator 430 may receive a result of detecting the user motion from other electronic apparatuses, rather than the wearable device 400. The communicator 430 may transmit and receive data to and from the other electronic apparatuses via Zigbee, Wifi, Blutooth, or the like.

The storage 440 may store a DB 411 (hereinafter, "a learning DB") related to learning data and the DB 442 (hereinafter, "the reference DB") related to a reference, under control of the controller 420. The learning data DB 441 may store the learning data with respect to use characteristics and muscle activation of a user. The learning data DB 441 may output an optimal EMS intensity, an optimal EMS direction, an optimal EMS cycle, etc. for each user to the controller 420. Also, the learning data DB 441 may store a degree of sensitivity and a degree of muscle activation that are learned with respect to each user.

The reference DB 442 may provide the standard reference muscle activation degree to the controller 420. The reference DB 442 may store a reference model based on a height, a weight, etc. of a user.

The output interface 450 may include a digital-analog conversion (DAC) filter 451, a motor/pump 452, an EMS emitter 453, and an EMS canceller 454. The DAC filter 451 may convert a digital signal received from the controller 420 into an analog signal. The motor/pump 452 may control a device configured to prevent a change in a wearing position. The EMS emitter 453 may emit an EMS signal via an electrode. The EMS canceller 454 may generate an activation pattern and sequence of the ground electrode configured to prevent the emission of the EMS signal, in correspondence to the EMS emitter 453. The EMS canceller 454 may appropriately cancel the EMS signal based on an intensity and a direction of an electrical signal emitted from the EMS emitter 453 and a type of targeted muscles. Also, the EMS canceller 454 may prevent a conductive signal propagated via interior and exterior portions of skin of a user from intruding into an area in which non-targeted muscles are located, thereby controlling the propagation of the EMS signal due to conductivity of the skin and the human body.

FIG. 4B is a block diagram for describing a method of detecting a user motion by using depth data and an EMG signal. Referring to FIG. 4B, the wearable device 400 may detect the user motion by receiving the depth data from a synchronized device 500.

The synchronized device 500 may be a device connected to the wearable device 400 wirelessly or in wires. The synchronized device 500 may receive data from the wearable device 400 or transmit data to the wearable device 400.

The synchronized device 500 may include a depth camera 510, a controller 520, and a communicator 530. The depth camera 510 may photograph a user and generate the depth data. The depth data may be output to the controller 520 and may be transmitted to the wearable device 400 via the communicator 530.

The depth camera 510 may use a time of light (TOF) method and a pattern change capturing method. According to the TOF method, a depth is calculated by identifying a phase change of reflected waves. The depth camera 510 may use infrared rays. In an environment in which the infrared rays are strongly incident, a recognition rate of the depth camera 510 may be decreased. Thus, the wearable device 400 may detect the user motion by using not only the depth data, but also an sEMG signal measured by the input interface 410.

The wearable device 400 may use the EMG signal to complement the depth data, with respect to a portion, for which depth measurement via the depth camera 510 is unreliable. The input interface 410 may measure the EMG signal by using an electrode pad located on a local musculoskeletal system of a user. The wearable device 400 may estimate a motion of the musculoskeletal system of the user by filtering the sEMG signal and extracting a pattern or maximum and minimum values of the sEMG signal. Thus, the wearable device 400 may detect the user motion by complementing the depth data, based on the estimated motion of the musculoskeletal system.

The controller 420 may detect the user motion by using input data received from the input interface 410 and the depth data. For example, the controller 420 may detect an overall user motion by using the depth data and may detect a detailed user motion by using the input data. The controller 420 may extract an outline of the user by using the depth data and may track a change in a motional state by using the input data. The input data may be an EMG signal. The controller 420 may detect the motion by analyzing the EMG signal. Since the controller 420 uses the depth data and the input data, the controller 420 may precisely detect the user motion.

Figure 4C:
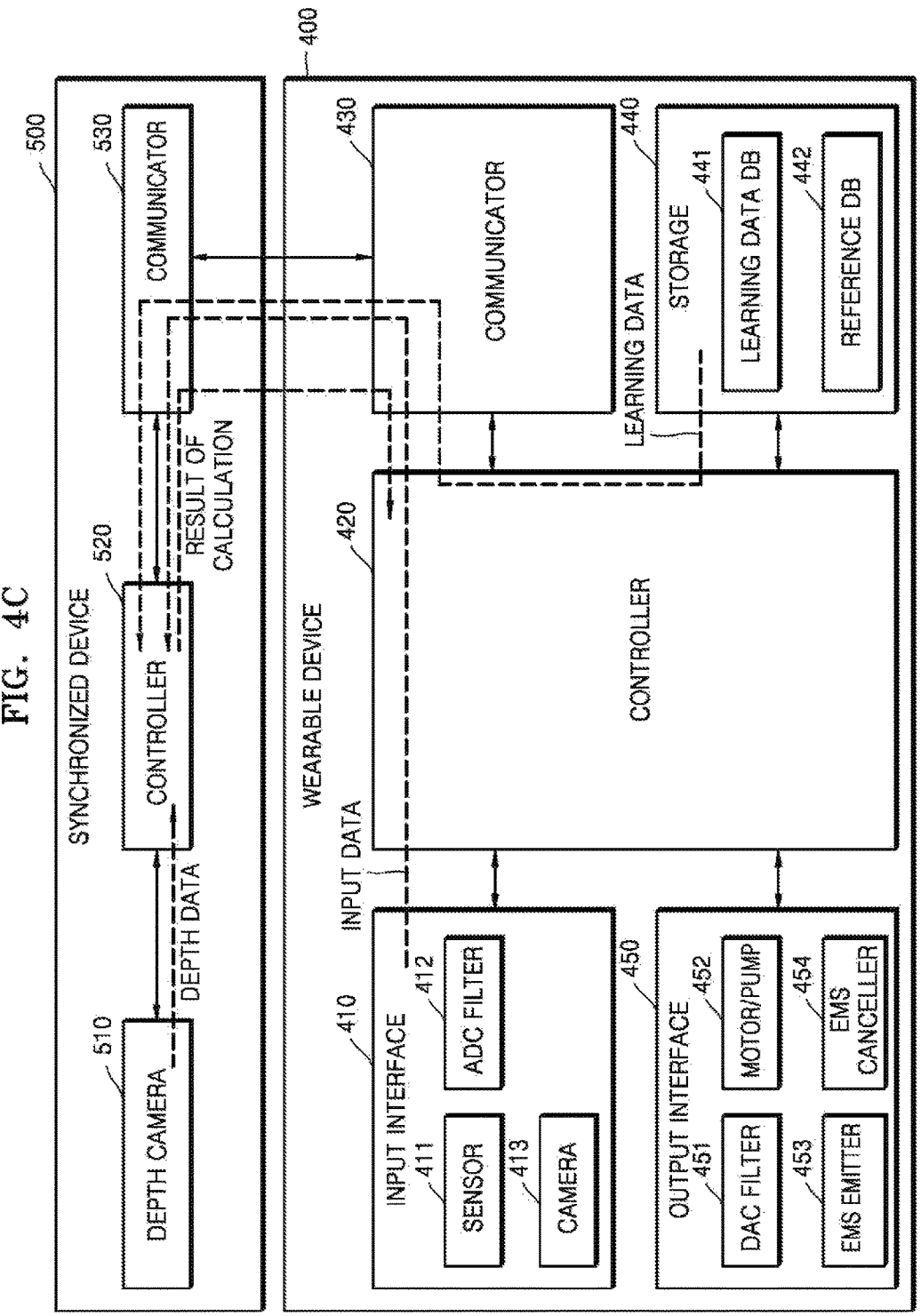
FIG. 4C is a block diagram for describing a method of detecting a user motion by using depth data and an EMG signal.

FIG. 4C is a block diagram for describing a method of detecting a user motion by using depth data and an EMG signal. The synchronized device 500 may perform a calculation by using the input data and the depth data and output a result of the calculation to the wearable device 400. The result of the calculation may refer to the user motion. In other words, the synchronized device 500 may detect the user motion by using the input data and the depth data and output the result of the detection to the wearable device 400. For example, the wearable device 400 may measure an sEMG signal generated due to motion of muscles of a user and transmit the sEMG signal to the synchronized device 500. The synchronized device 500 may complement the depth data or provide additional information, by using the received sEMG signal.

The synchronized device 500 may track a motional state or a change in a position of the user by analyzing a pattern of the sEMG signal or a change in the sEMG signal. Alternatively, the synchronized device 500 may track the motional state or the change in the position of the user by analyzing the pattern of the sEMG signal or comparing the change in the sEMG signal with a reference.

The controller 520 may receive the depth data from the depth camera 510 and receive the input data from the wearable device 400. The controller 520 may perform a calculation by using the depth data and the input data and output a result of the calculation again to the wearable device 400. Thus, the wearable device 400 does not have to perform the calculation and may control the output interface 450 to output a feedback signal, based on the result of the calculation that is received.

FIG. 5 is a view for describing examples of EMG signals 21 and 22 generated during contraction and relaxation of muscles 20. As illustrated in FIG. 5, the EMG signal 21 generated when the muscles 20 are contracted and the EMG signal 22 generated when the muscles 20 are relaxed are different from each other. The wearable device 400 may detect a user motion via a position, a pattern, etc., in which the EMG signals 21 and 22 are measured. Also, the wearable device 400 may induce contraction or relaxation of the muscles 20 by transmitting a signal having the same pattern as the EMG signal 21 or 22.

Figure 6:
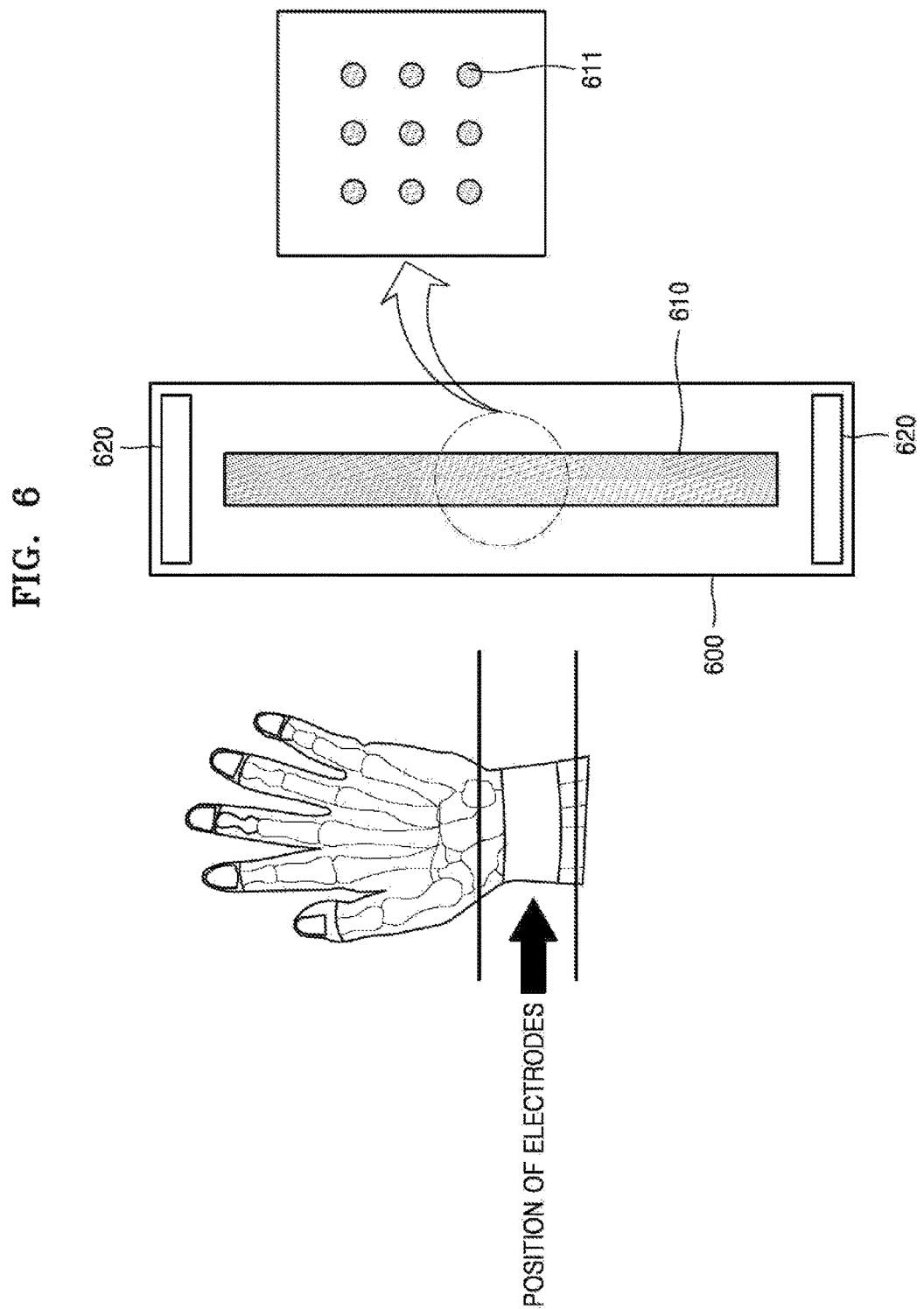
FIG. 6 is a schematic view for describing a wearable device according to an embodiment.

FIG. 6 is a schematic view for describing a wearable device 600 according to an embodiment. Referring to FIG. 6, the wearable device 600 may be a type wearable to a wrist. The wearable device 600 may include a Velcro 620 and an electrode pad 610. A user may fix the wearable device 600 to the wrist of the user by using the Velcro 620. The user may fix the wearable device 600 such that the electrode pad 610 contacts skin of the user.

When the user wears the wearable device 600, the electrode pad 610 contacts a body of the user. Also, when the user wears the wearable device 600 to the wrist, the electrode pad 610 is located in an area in which muscles of fingers are divided. Thus, the wearable device 600 may output an EMS signal to muscles of the finger to which a feedback signal is to be transmitted. With respect to FIG. 6, a case is described in which the wearable device 600 is worn to the wrist. However, the wearable device 600 may be worn to various parts of the body of the user, such as a finger, a shoulder, a thigh, etc. Thus, the wearable device 600 may be worn to a body part to which the feedback signal is to be transmitted and may transmit the feedback signal based on a user motion.

The electrode pad 610 may sense an EMG signal generated based on the user motion. The electrode pad 610 may sense the EMG signal generated from the body, via electrodes 611. Thus, the wearable device 600 may detect the user motion, according to a location of the electrodes 611, via which the EMG signal is sensed.

The electrode pad 610 may include the electrodes 611 outputting an EMS signal to a wrist of the user. In other words, the electrode pad 610 may include the plurality of electrodes 611. The electrodes 611 may have different distributions, shapes, sizes, etc. based on muscles.

The electrode pad 610 may be used for both inputting and outputting a signal. In other words, the wearable device 600 may output the EMS signal or receive the EMG signal, via the electrode pad 610.

The wearable device 600 may transmit the feedback signal for each finger. The electrode pad 610 may output the EMS signal via some of the plurality of electrodes 611. The wearable device 600 may determine a finger to which the EMS signal is to be transmitted and determine the electrode 611 contacting muscles of the determined finger. The wearable device 600 may output the EMS signal via the determined electrode 611.

FIG. 6 illustrates a case in which the electrode pad 610 has a straight shape. However, shapes of the electrode pad 610 may vary so that the electrode pad 610 may easily contact the body of the user. Also, shapes and positions of muscles are different for each body part of the user, and thus, the electrode pad 610 may be formed as a different shape for each body part, on which the electrode pad 610 is located, or may include the electrodes 611 having different shapes. According to another embodiment, the electrode pad 610 may be formed to be coupled to the body.

The wearable device 600 may transmit the feedback signal to a finger of the user that was used for a space input operation or to muscles connected to the finger, by detecting the finger by detecting the user motion. A position from which the EMG signal is generated, a format of the EMG signal, an intensity of the EMG signal, etc. may vary based on the user motion. Thus, the wearable device 600 may detect the user motion based on the sensed EMG signal. The wearable device 600 may select the electrode 611 to which the feedback signal is to be transmitted based on the user motion, and may output the feedback signal (that is, the electrical signal) to the selected electrode 611. The wearable device 600 may output the feedback signal to the plurality of electrodes 611, and may differently set points in time in which the electrical signal is output to the plurality of electrodes 611, duration times of the electrical signal, etc.

Figure 7:
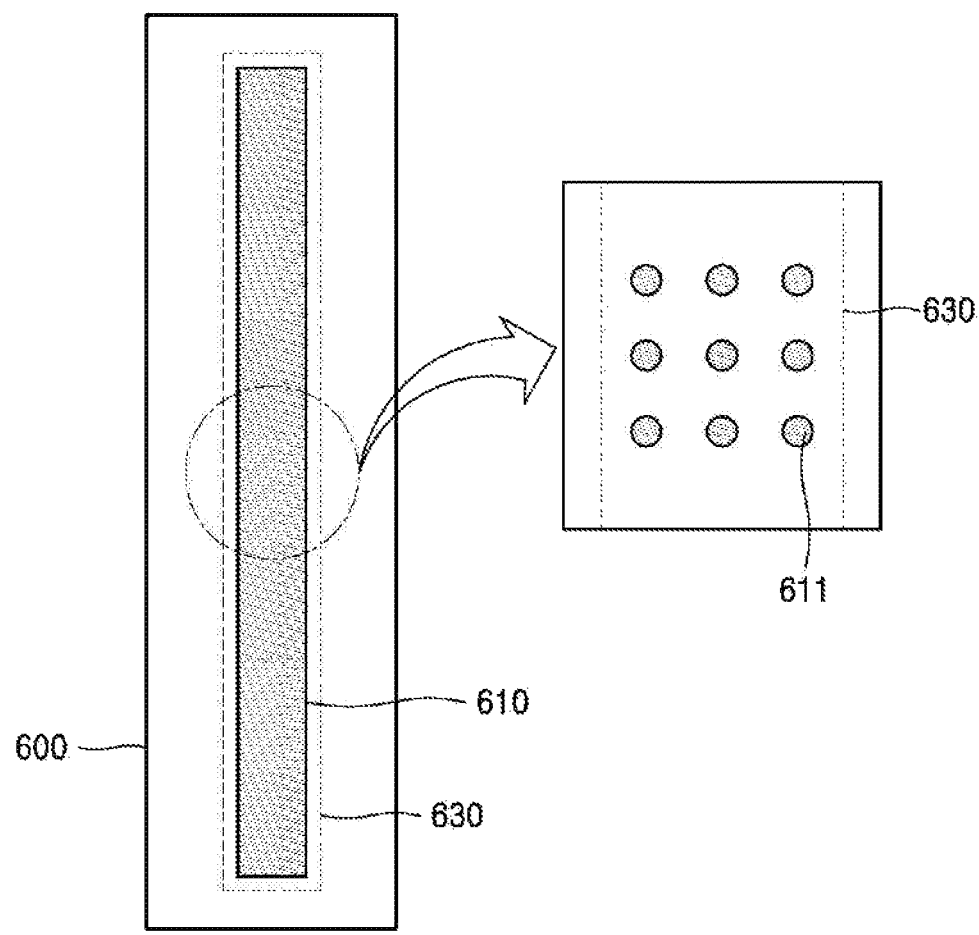
FIG. 7 is a diagram for describing an electrode type of a wearable device, according to another embodiment.

FIG. 7 is a diagram for describing an electrode type of the wearable device 600, according to another embodiment. Referring to FIG. 7, the wearable device 600 may further include a ground electrode 630. The ground electrode 630 may be formed around the electrode pad 610. The ground electrode 630 may prevent an EMS signal output to the electrode pad 610 from being emitted to a surrounding environment.

Figure 8:
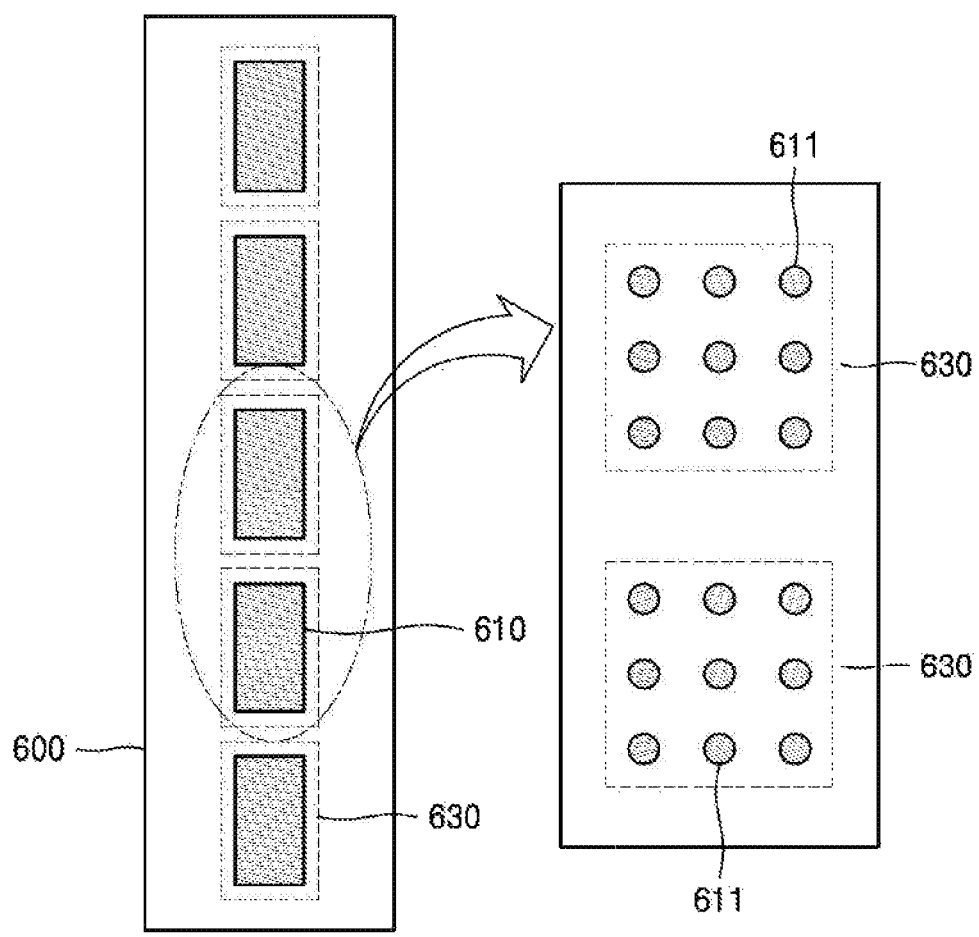
FIG. 8 is a diagram for describing an electrode type of a wearable device, according to another embodiment.

FIG. 8 is a diagram for describing an electrode type of the wearable device 600, according to another embodiment. Referring to FIG. 8, the wearable device 600 may include a plurality of electrode pads 610. The plurality of electrode pads 610 may be electrically separated from one another via ground electrodes 630. The electrode pads 610 may have a square shape. The wearable device 600 may determine the electrode pad 610 to which an EMS signal is to be output and may determine one of the electrodes 611 included in the determined electrode pad 610, to which the EMS signal is to be output.

Figure 9:
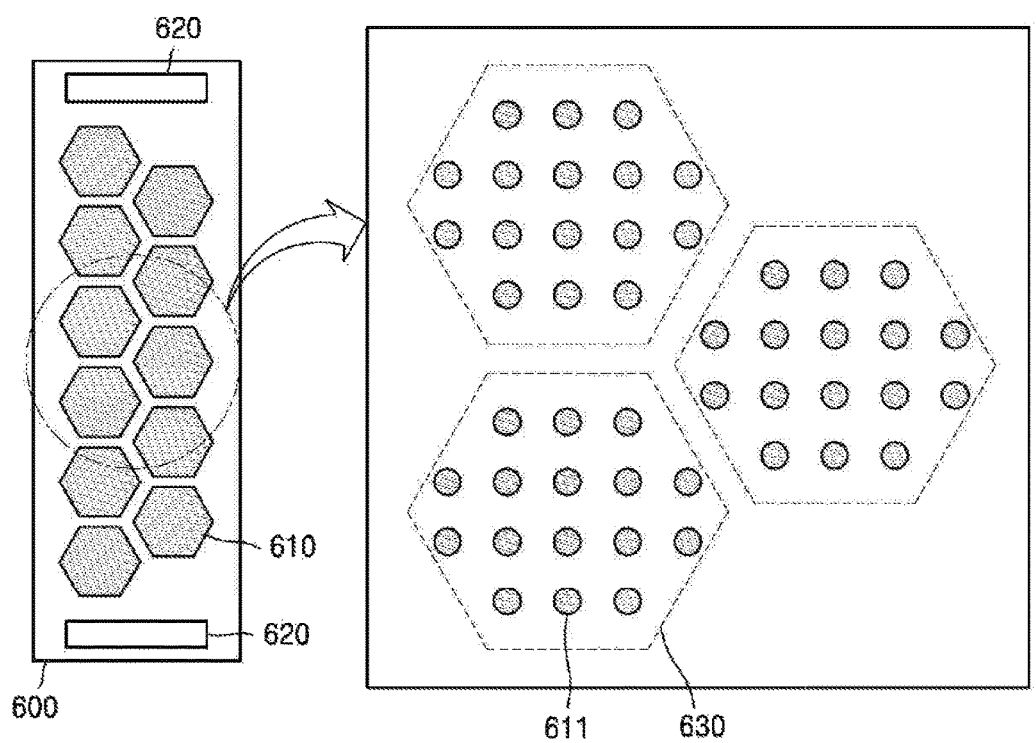
FIG. 9 is a diagram for describing an electrode type of a wearable device, according to another embodiment.

FIG. 9 is a diagram for describing an electrode type of the wearable device 600, according to another embodiment. Referring to FIG. 9, the wearable device 600 may include polygonal electrode pads 610. FIG. 9 illustrates, for example, hexagonal electrode pads 610. However, the electrode pads 610 may have a pentagonal, a heptangular, or a circular shape. Each of the hexagonal electrode pads 610 may be surrounded by the ground electrode 630.

Figure 10A:
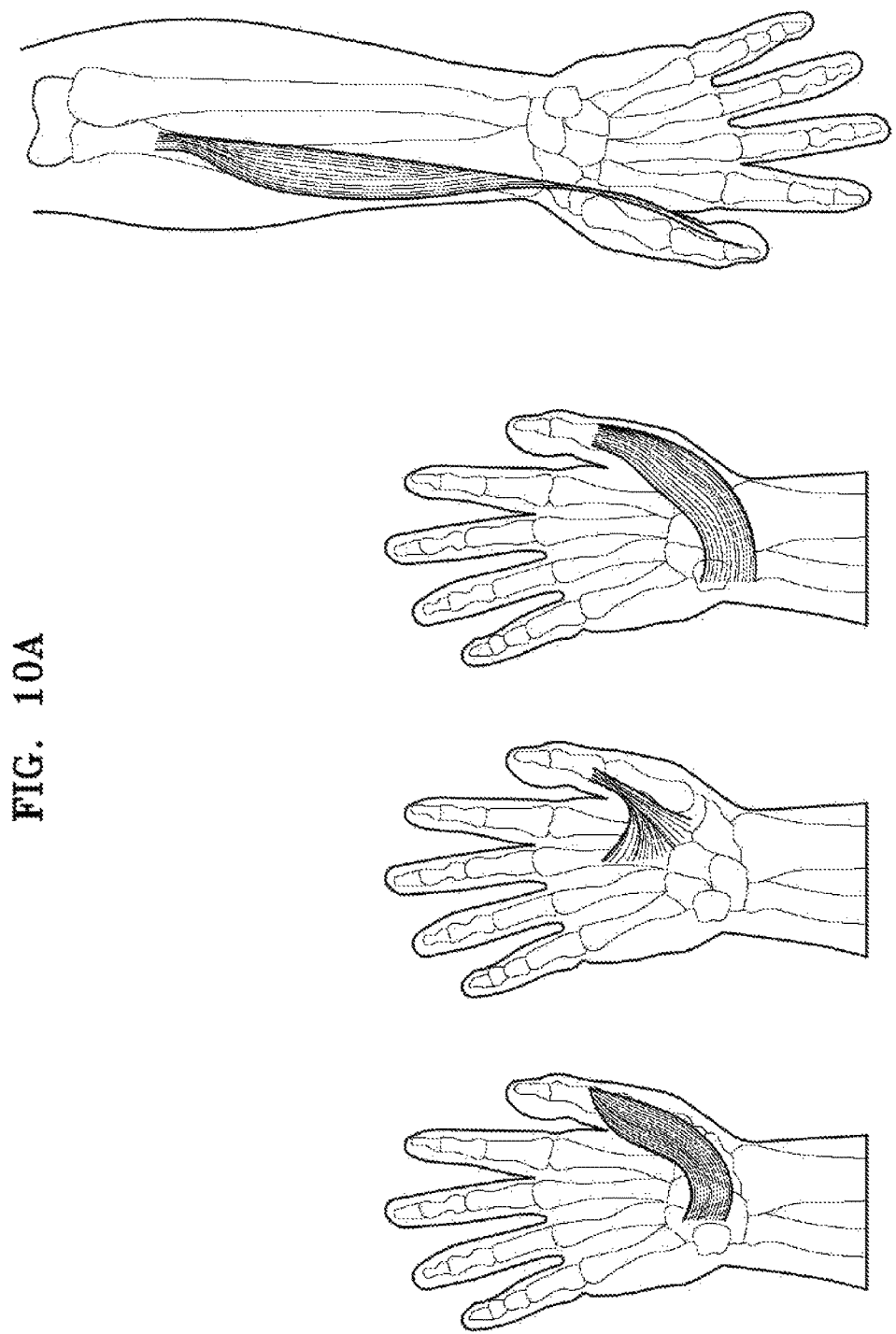
FIGS. 10A through 10D are views for describing muscles connected to a body part to which a feedback signal is to be transmitted by a wearable device.
Figure 10B:
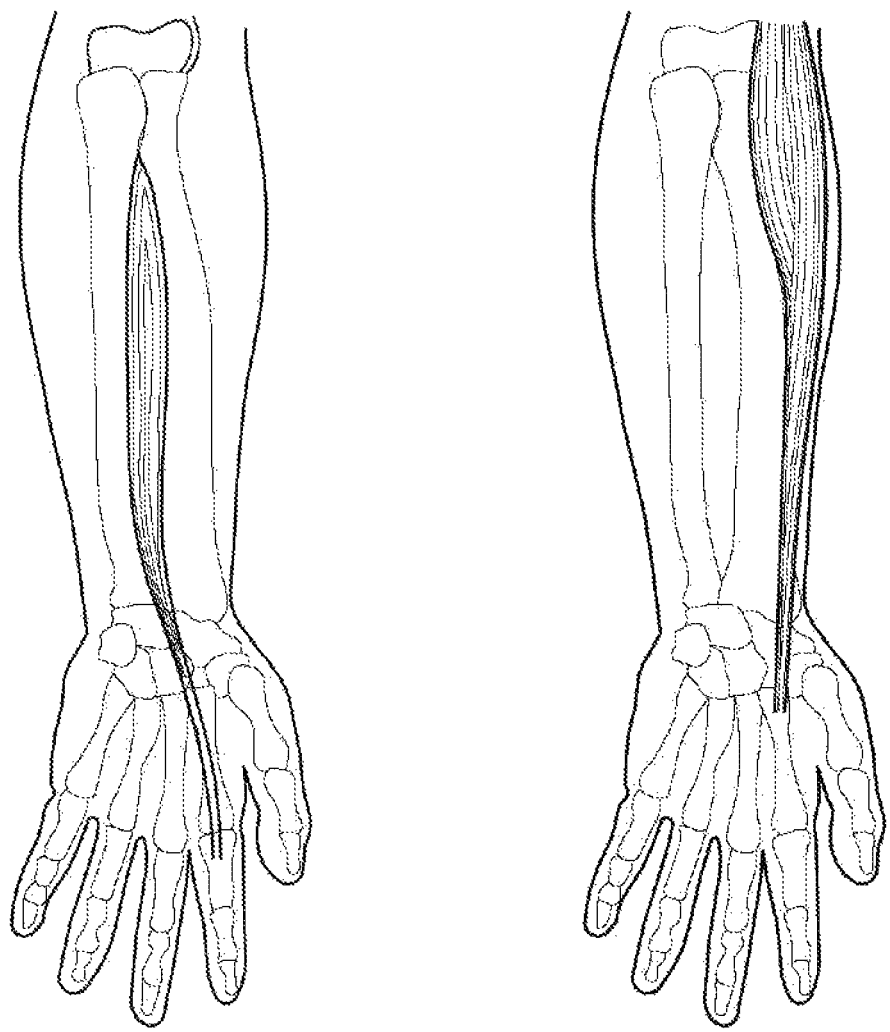
Figure 10C:
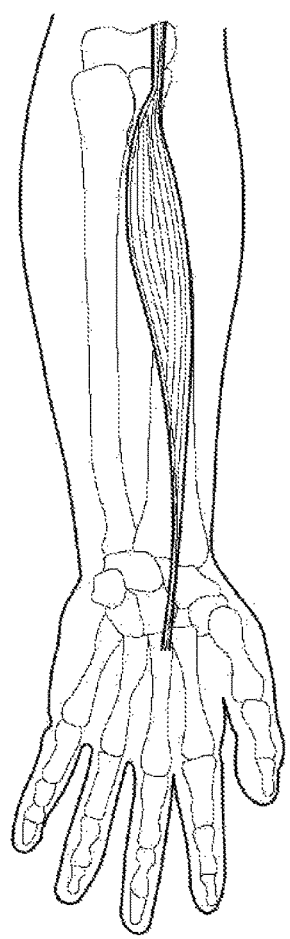
Figure 10D:
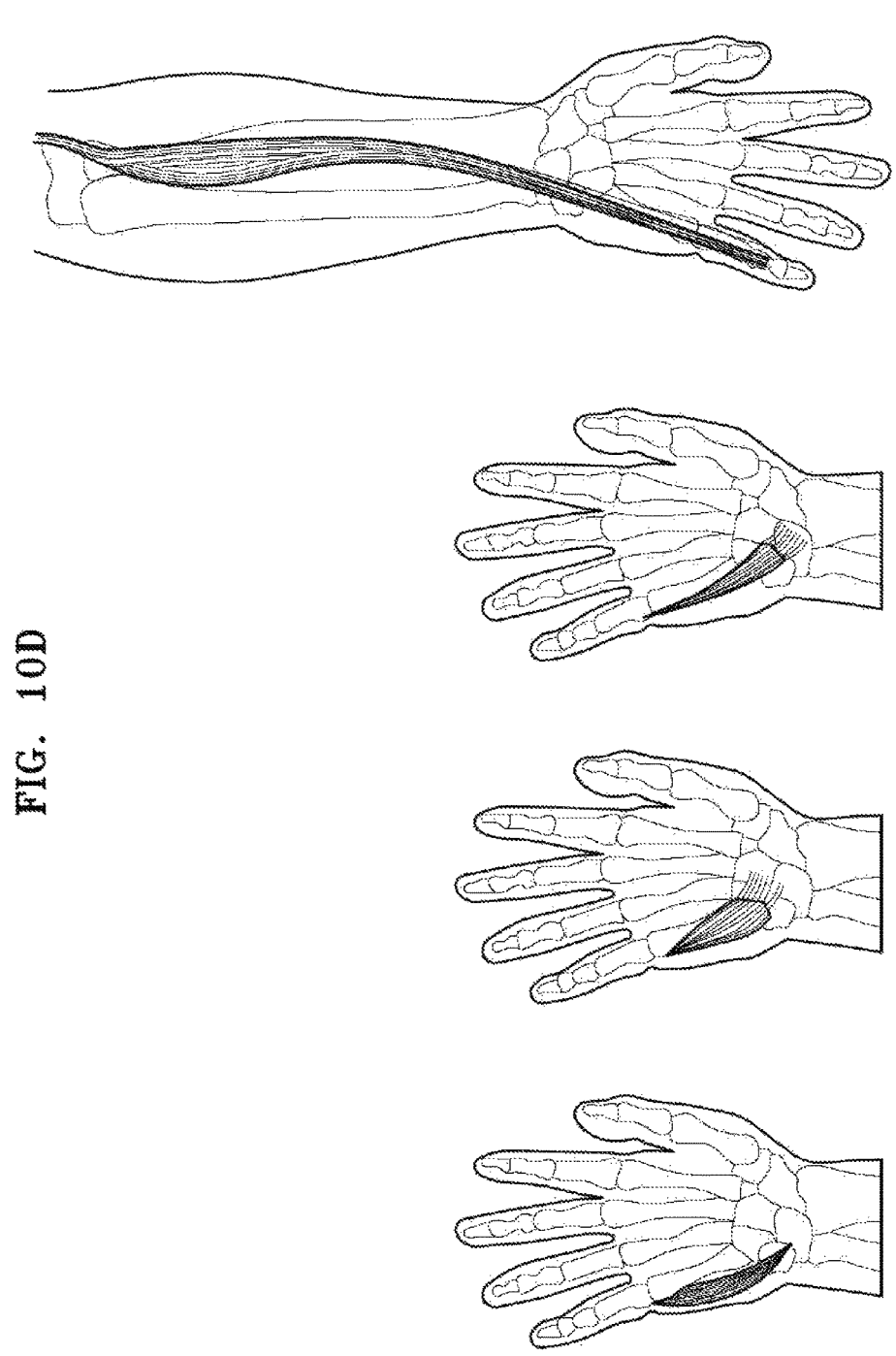

FIGS. 10A through 10D are views for describing muscles connected to a body part to which a feedback signal is to be transmitted via the wearable device 600. Referring to FIGS. 10A through 10D, the wearable device 600 may output the feedback signal such that a thumb, an index finger, a middle finger, a little finger, etc., experience a physical repellant force. FIG. 10A is the view for describing the muscles connected to the thumb, FIG. 10B is the view for describing the muscles connected to the index finger, FIG. 10C is the view for describing the muscles connected to the middle finger, and FIG. 10D is the view for describing the muscles connected to the little finger.

The wearable device 600 may detect a user motion and determine by which one of the thumb, the index finger, the middle finger, and the little finger the user has performed a space input operation. For example, when the wearable device 600 determines that the user has performed the space input operation by using the thumb, the wearable device 600 may transmit the feedback signal to any of the muscles via which the thumb experiences a physical repellant force.

The wearable device 600 may transmit the feedback signal to muscles related to motions of the thumb, the index finger, the middle finger, and the little finger illustrated in FIGS. 10A through 10D, so that the fingers may experience the physical repellant force.

The wearable device 600 may select an electrode contacting or located around the muscles connected to the motions of the fingers, and output an EMS signal to the selected electrode. The wearable device 600 may determine an intensity, a direction, or a cycle of the EMS signal, based on a user, and may output the EMS signal based on the determined intensity, direction, or cycle.

FIGS. 10A through 10D illustrate the embodiments in which the feedback signal is output to the muscles related to the motions of the fingers. However, when the user performs the space input operation by using other body parts rather than the fingers, the wearable device 600 may transmit the feedback signal to muscles related to the other body parts that have performed the space input operation, so that the user may experience a physical repellent force.

Figure 11:
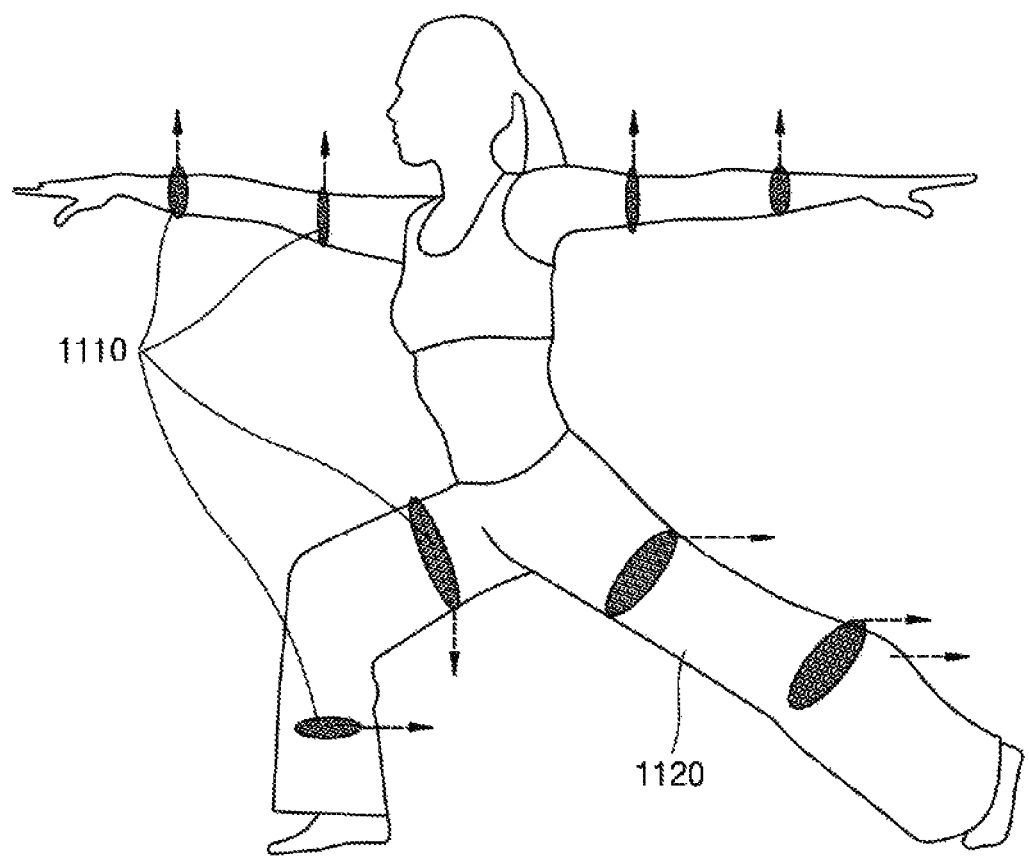
FIG. 11 is a schematic view for describing a method of transmitting a feedback signal, according to an embodiment.

FIG. 11 is a schematic view for describing a method of transmitting a feedback signal, according to an embodiment. Referring to FIG. 11, a band-type feedback device 1110 or a clothing-type feedback device 1120 may determine whether a user motion corresponds to a reference motion, and may transmit the feedback signal to a body part not corresponding to the reference motion, based on a result of the determination. The band-type feedback device 1110 or the clothing-type feedback device 1120 may be examples of a wearable device.

The band-type feedback device 1110 or the clothing-type feedback device 1120 may directly detect a user motion or may receive a detected user motion from electronic apparatuses located around the user. The band-type feedback device 1110 or the clothing-type feedback device 1120 may detect the user motion via an input interface. For example, the band-type feedback device 1110 or the clothing-type feedback device 1120 may detect the user motion via an EMG signal received via electrodes. The band-type feedback device 1110 or the clothing-type feedback device 1120 may include an electrode pad located on a body of a user and may sense the EMG signal via electrodes included in the electrode pad. A controller of the band-type feedback device 1110 or the clothing-type feedback device 1120 may detect the user motion based on a body part from which the EMG signal is measured, an intensity of the EMG signal, a format of the EMG signal, etc.

As another example, the band-type feedback device 1110 or the clothing-type feedback device 1120 may detect the user motion via a depth image photographed by a depth camera of a synchronized device. The depth camera may obtain the depth image by measuring a distance between each body part of the user and the depth camera, based on movements of the user. When the movement of the user is changed, the distance between each body part of the user and the depth camera is changed. The depth camera may obtain the depth image whenever the movement of the user is changed.

The band-type feedback device 1110 or the clothing-type feedback device 1120 may receive the depth image from the synchronized device. The controller of the band-type feedback device 1110 or the clothing-type feedback device 1120 may detect the user motion via the received depth image. The synchronized device may transmit a result of detecting the user motion by using the depth image to the band-type feedback device 1110 or the clothing-type feedback device 1120. The synchronized device may be an additional device located in front of the user.

The synchronized device may be connected to the band-type feedback device 1110 or the clothing-type feedback device 1120 wirelessly or in wires and transmit and receive data to and from the band-type feedback device 1110 or the clothing-type feedback device 1120.

The band-type feedback device 1110 or the clothing-type feedback device 1120 may compare the user motion with a reference motion, or may receive a result of the comparison from the synchronized device. The band-type feedback device 1110 or the clothing-type feedback device 1120 may determine a body part with respect to which the user motion and the reference motion are different from each other. For example, the band-type feedback device 1110 or the clothing-type feedback device 1120 may calculate an error between the user motion and the reference motion by calculating a difference between position coordinates of feature points of the user motion and the reference motion.

The band-type feedback device 1110 or the clothing-type feedback device 1120 may determine a body part to which an electrical signal is to be transmitted, based on the calculated error. The band-type feedback device 1110 or the clothing-type feedback device 1120 may output the electrical signal to stimulate the determined body part. The electrical signal may be transmitted to the body part determined based on the error between the user motion and the reference motion, or to muscles around the determined body part, and the electrical signal may be output to decrease the error between the user motion and the reference motion so as to correct the user motion. The band-type feedback device 1110 or the clothing-type feedback device 1120 may output the electrical signal to decrease the error. Alternatively, the band-type feedback device 1110 or the clothing-type feedback device 1120 may output the electrical signal until the error becomes 0. In other words, the band-type feedback device 1110 or the clothing-type feedback device 1120 may update the error by re-detecting the user motion while outputting the electrical signal, and may output the electrical signal via the electrode pad until the error becomes 0. As another example, the band-type feedback device 1110 or the clothing-type feedback device 1120 may output the electrical signal until the error becomes less than a predetermined threshold value. Since the user motion and the reference motion may not be able to perfectly correspond to each other, the band-type feedback device 1110 or the clothing-type feedback device 1120 may set a threshold value and output the electrical signal until the error becomes less than the threshold value. Here, the threshold value may be set as a value, at which there is no need to provide a feedback, even if the error is not 0.

Figure 12A:
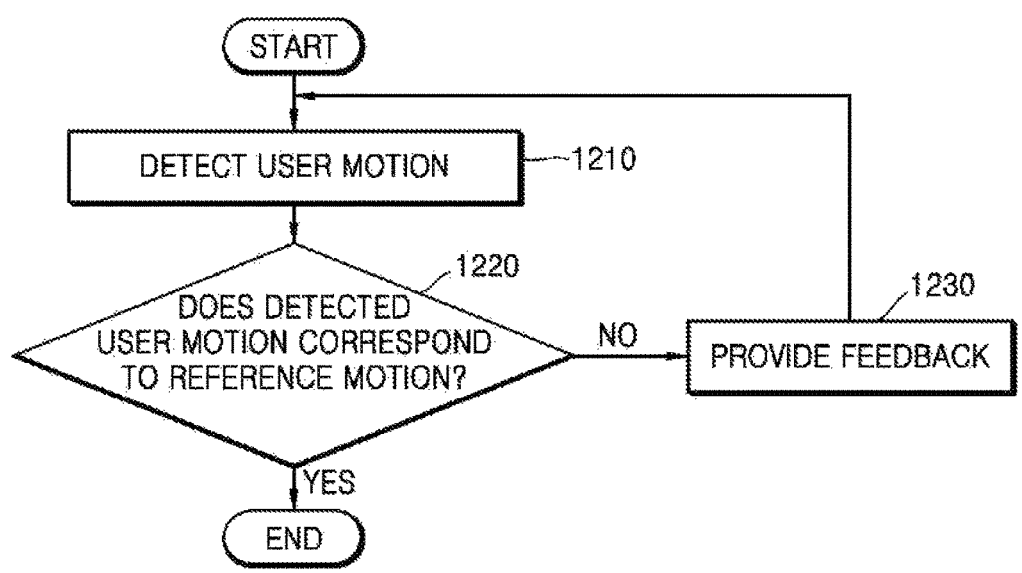
FIG. 12A is a flowchart of a method of outputting a feedback signal, according to an embodiment.

FIG. 12A is a flowchart of a method of outputting a feedback signal, according to an embodiment. Referring to FIG. 12A, the wearable device may provide feedback to a user by comparing a user motion and a reference motion.

In operation S1210, the wearable device may detect the user motion. The wearable device may detect the user motion by using sensors.

The wearable device may receive physical information of the user from the user or may directly scan a body of the user to obtain the physical information. The physical information refers to a height, an appearance, a weight, etc. of the user.

The wearable device may measure a body rate of the user. The wearable device may detect feature points (for example, a neck, a left elbow, a right knee, etc.) of the user and measure the body rate of the user based on distances among the feature points.

In operation S1220, the wearable device may determine whether the user motion corresponds to the reference motion. When it is determined that the user motion corresponds to the reference motion, the method is ended, and when it is determined that the user motion does not correspond to the reference motion, the method may proceed to operation S1230.

The user may select the reference motion. Alternatively, the wearable device may scan the body of the user, and may determine a reference model which is the most similar to the body of the user and select a motion included in motions of the reference model, the motion being the most similar to the user motion.

The wearable device may compare the selected motion with the user motion. The wearable device may compare a motion of the body of the user with a motion of the reference model. The wearable device may compare feature points of the body of the user with feature points of the reference model, the feature points of the reference model corresponding to the feature points of the body of the user. The wearable device may calculate differences between the feature points of the body of the user and the feature points of the reference model. In more detail, the wearable device may allow the body of the user to correspond to the reference model and store an amount of change with respect to each of the feature points to obtain an amount of change of the body of the user.

In operation S1230, the wearable device may provide feedback. When the user motion does not correspond to the reference motion, the wearable device may transmit the feedback signal to the user. The wearable device may transmit the feedback signal to a body part at which the user motion and the reference motion do not correspond to each other, thereby providing to the user the feedback as to which body part does not correspond to the reference motion. After the wearable device provides the feedback, the method may proceed to operation S1210.

The wearable device may provide the feedback until the wearable device determines that the user motion corresponds to the reference motion.

Figure 12B:
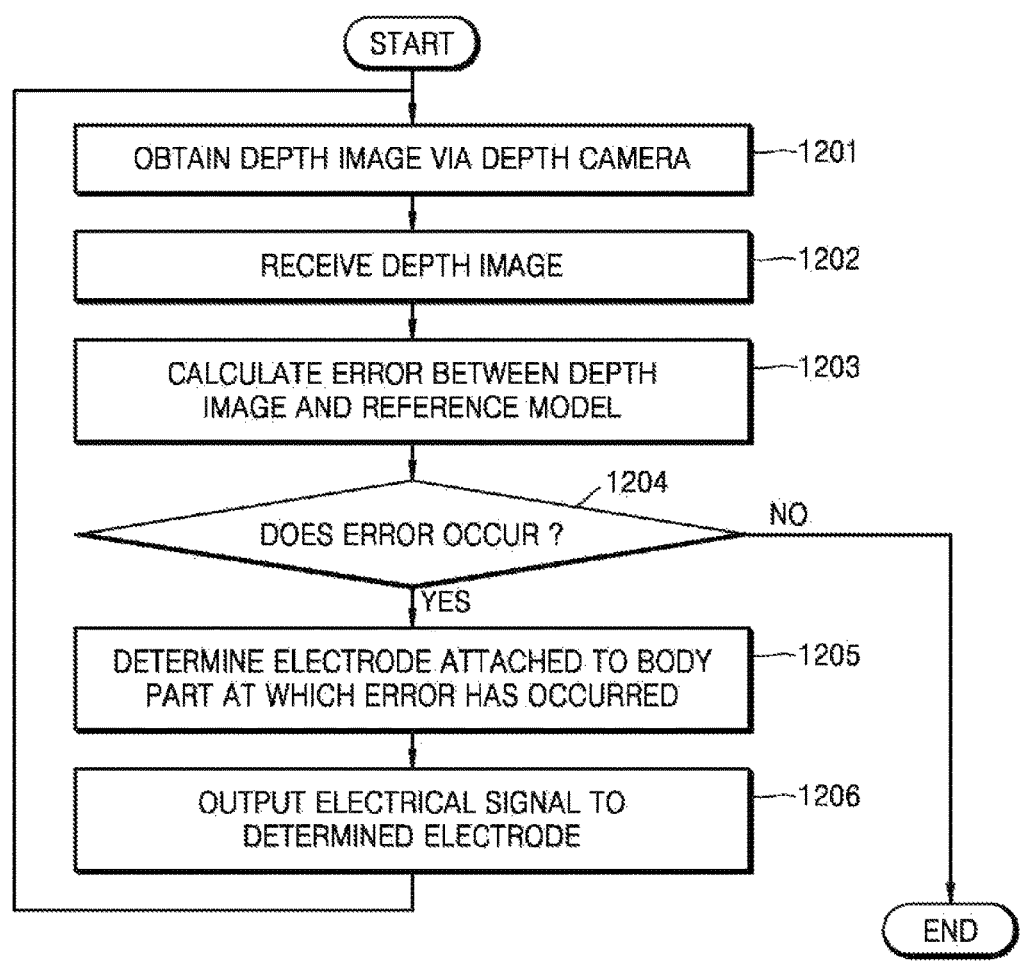
FIG. 12B is a flowchart of a method of transmitting a feedback signal, according to an embodiment.

FIG. 12B is a flowchart of a method of transmitting a feedback signal, according to an embodiment.

In operation S1201, a synchronized device may obtain a depth image via a depth camera. The synchronized device may obtain the depth image by photographing a user based on a predetermined cycle. The synchronized device may detect a user motion by using not only the depth camera, but also various sensors, cameras, etc.

In operation S1202, a wearable device may receive the depth image from the synchronized device.

In operation S1203, the wearable device may detect the user motion via the depth image and calculate an error between the user motion and a reference motion.

In operation S1204, the wearable device may determine whether an error has occurred. The wearable device may determine whether an error has occurred for each body part.

In operation S1205, the wearable device may determine an electrode located on the body part at which an error has occurred.

In operation S1206, the wearable device may output an electrical signal to the determined electrode. The wearable device may output an EMS signal via the electrode in order to provide the feedback signal to the user.

When the user motion and the reference motion do not correspond to each other, operations S1201 through S1206 may be repeatedly performed, and when the user motion and the reference motion correspond to each other, the method may be ended.

Figure 13:
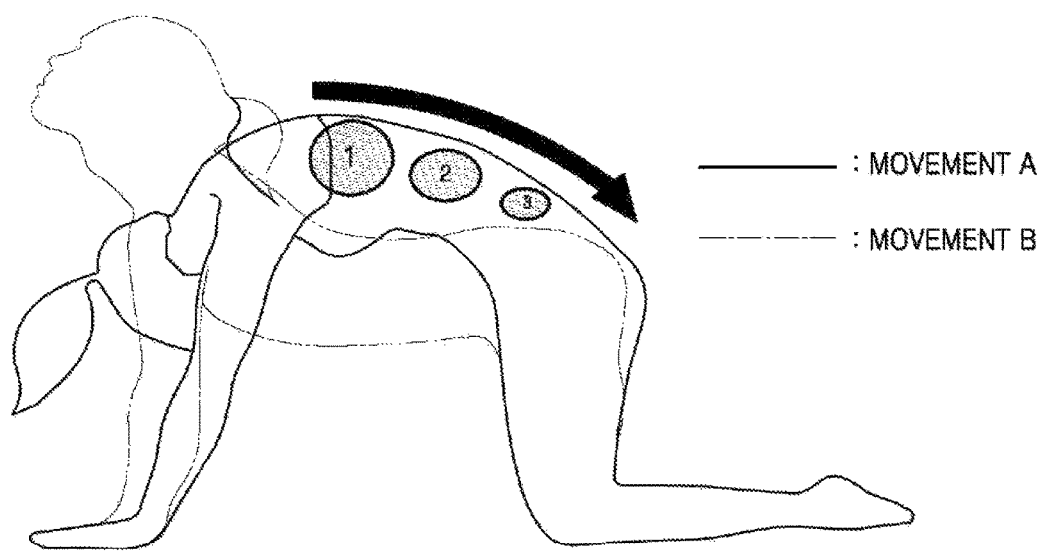
FIG. 13 is a view for describing an operation of changing a user motion by transmitting a feedback signal.

FIG. 13 is a view for describing an operation of changing a movement of a user by transmitting a feedback signal. Referring to FIG. 13, when the user does a yoga movement of bending his/her back, the movement of the user may not be correct. For example, a degree of muscle contraction and relaxation of the user may not correspond to a reference movement. The wearable device may determine whether the movement of the user is correct and transmit the feedback signal to the user.

The wearable device may detect the yoga movement of the user via a depth image. A synchronized device may be located right in front of the user to photograph the yoga movement of the user and obtain the depth image. The synchronized device may transmit the depth image to the wearable device. The wearable device may detect the yoga movement of the user via the depth image, and may compare the yoga movement of the user with a reference movement to determine whether the yoga movement of the user is correct. Alternatively, the wearable device may detect the yoga movement of the user via an electrical signal sensed via an electrode pad located on a body of the user, and detect the yoga movement of the user by combining the depth image and the electrical signal.

The wearable device may determine whether the user movement is correct by comparing the detected yoga movement with the reference movement. For example, a direction in which the user bends his or her back may be opposite to a direction of the reference movement, and the wearable device may determine the back of the user as a body part to which the feedback signal is to be transmitted. Alternatively, leg or arm movements of the user may not correspond to reference movements, and the wearable device may determine the leg or arm as the body part to which the feedback signal is to be transmitted.

The wearable device may transmit the feedback signal to positions 1 through 3 to change the user movement. When the user does movement A indicated via a full line and the reference movement is movement B indicated via dotted lines, the wearable device may transmit the feedback signal to positions 1 through 3. The wearable device may transmit the feedback signal to positions 1 through 3, until the user changes his or her movement to movement B indicated via the dotted lines. The wearable device may determine a direction of the feedback signal in order from position 1 to position 3, and may decrease a magnitude of the feedback signal in order from position 1 to position 3.

According to the present embodiment, an example in which the user does the yoga movement is described. However, the present embodiment may be applied to other sports games in which movement correction is necessary or other games in which physical movements are necessary.

Figure 14:
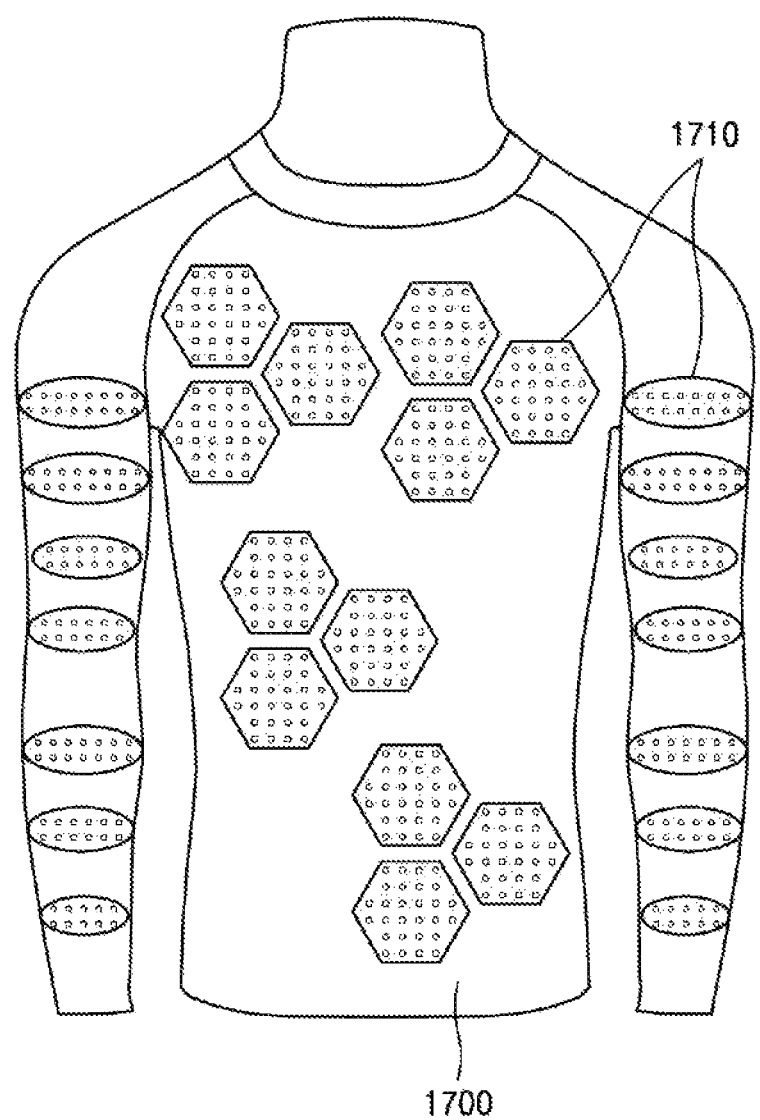
FIG. 14 is a view of smart clothes according to an embodiment.

FIG. 14 is a view of smart clothes 1700 according to an embodiment. The smart clothes 1700 may include a plurality of feedback devices 1710.

The smart clothes 1700 may detect a user motion by measuring an EMG signal via the feedback devices 1710. The smart clothes 1700 may detect the user motion based on positions of the feedback devices 1710 via which the EMG signal is measured, a pattern of the EMG signal, etc.

The feedback devices 1710 may be arranged in a circular shape in the smart clothes 1700. Thus, the feedback devices 1710 may contact a body of a user. The smart clothes 1700 may transmit a feedback signal to a targeted body part via the feedback devices 1710. The feedback devices 1710 may generate an EMS signal and output the EMS signal to the user via an electrode.

The feedback devices 1710 may be a plurality of electrode pads, and each of the electrode pads may include at least one electrode. The smart clothes 1700 may determine an electrode pad to which the feedback signal is to be output, and may activate only the determined electrode pad. The smart clothes 1700 may output the feedback signal to the activated electrode pad. Also, the smart clothes 1700 may output the feedback signal to only some of the plurality of electrodes included in one electrode pad in order to more precisely output the feedback signal.

Figure 15:
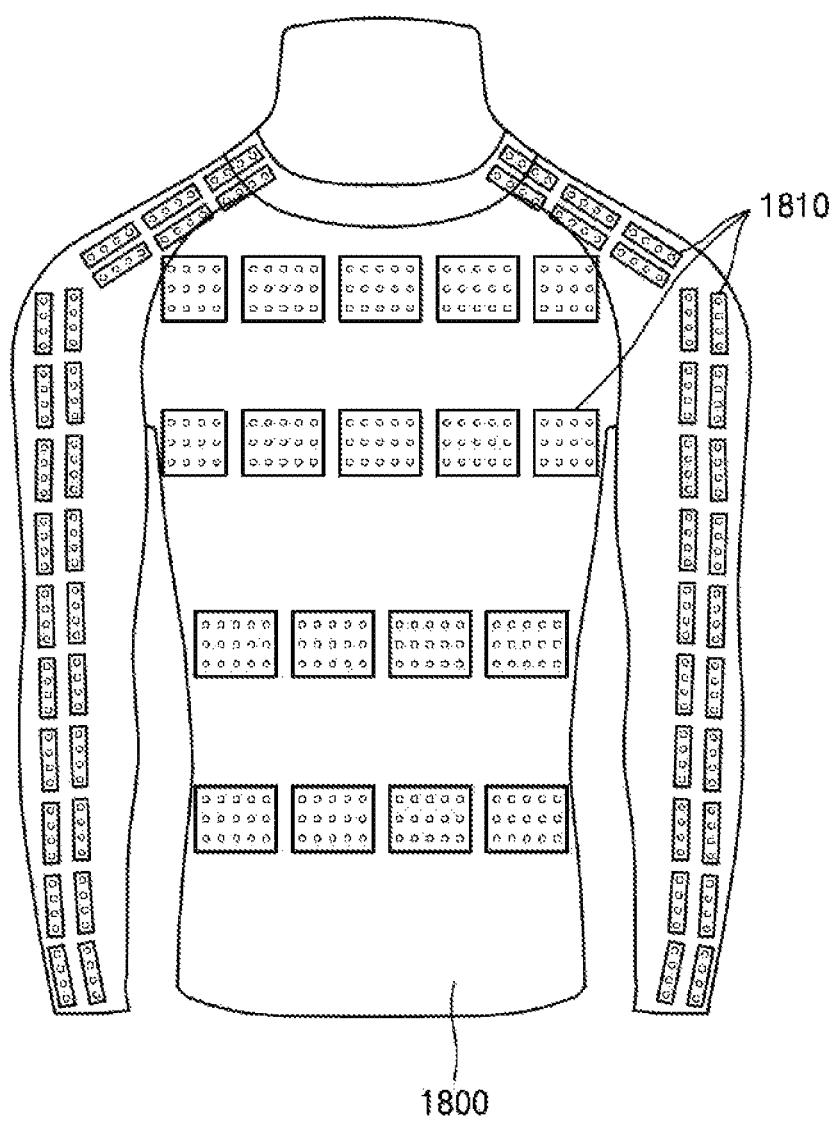
FIG. 15 is a view of smart clothes according to another embodiment.

FIG. 15 is a view of smart clothes 1800 according to another embodiment. The smart clothes 1800 may include a plurality of feedback devices 1810 and the feedback devices 1810 may be arranged in the smart clothes 1800 in a horizontal direction, a vertical direction, or in a grid shape. The feedback devices 1810 may be a plurality of electrode pads, and each of the electrode pads may include a plurality of electrodes. FIG. 15 illustrates square-shaped electrode pads. However, the electrode pads may have various shapes, such as a circular shape, a polygonal shape, etc.

The smart clothes 1800 may determine an electrode pad or an electrode, to which the feedback signal is to be output, and may activate only the determined electrode pad or electrode. The smart clothes 1800 may output the feedback signal to the activated electrode pad or electrode in order to more precisely output the feedback signal.

Figure 16A:
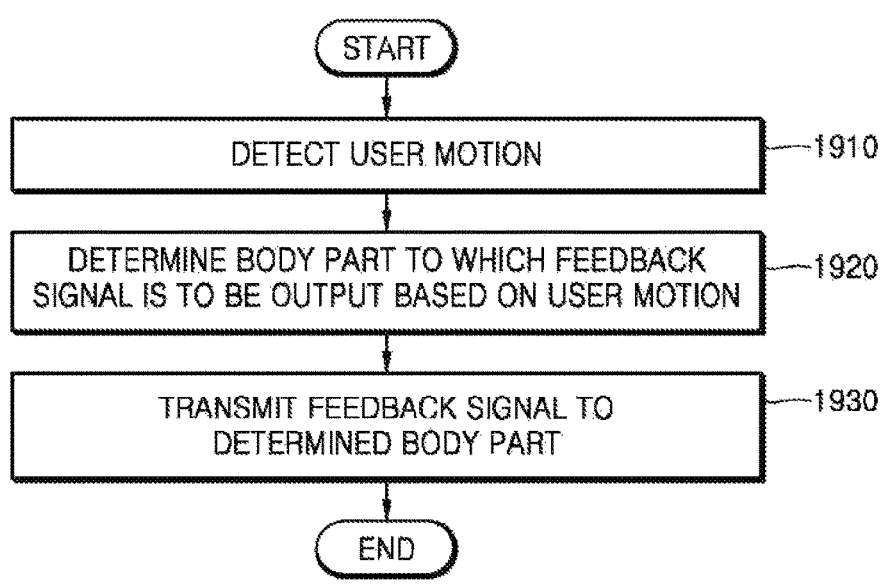
FIG. 16A is a flowchart of a method of outputting a feedback signal, according to an embodiment.

FIG. 16A is a flowchart of a method of outputting a feedback signal, according to an embodiment.

In operation S1910, a wearable device may detect a user motion. The wearable device may directly detect the user motion by using a sensor. Also, the wearable device may receive a result of detecting the user motion from another electronic apparatus.

In operation S1920, the wearable device may determine a body part to which the feedback signal is to be transmitted, based on the user motion. The wearable device may determine the body part of the user, which was used by the user for a space input operation, or determine the body part, with respect to which there is an error between the user motion and a reference motion.

In operation S1930, the wearable device may transmit the feedback signal to the determined body part. The wearable device may transmit vibration, sounds, or an electrical signal to the determined body part.

Figure 16B:
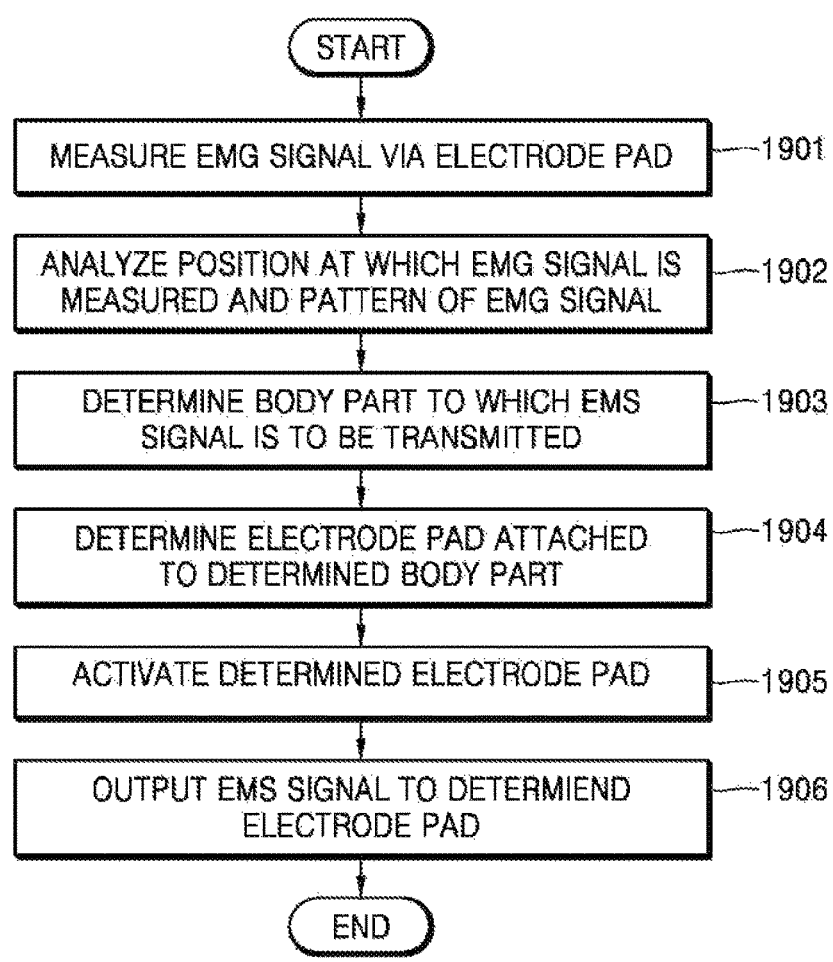
FIG. 16B is a flowchart of a method of outputting a feedback signal, according to an embodiment.

FIG. 16B is a flowchart of a method of outputting a feedback signal, according to an embodiment.

In operation S1901, a wearable device may measure an EMG signal via an electrode pad. The EMG signal is generated from muscles, based on a user motion. The electrode pad may sense the EMG signal and transmit the sensed EMG signal to a controller of the wearable device.

In operation S1902, the wearable device may analyze a position at which the EMG signal is measured and a pattern of the EMG signal. The wearable device may determine via which electrode pad the EMG signal is measured and analyze the pattern of the measured EMG signal. The wearable device may predict the user motion based on a result of the analysis.

In operation S1903, the wearable device may determine a body part to which the EMS signal is to be transmitted. Based on the user motion, the wearable device may determine a body part to which the EMS signal is to be transmitted in order to provide the feedback to the user.

In operation S1904, the wearable device may determine an electrode pad located on the determined body part.

In operation S1905, the wearable device may activate the determined electrode pad. Alternatively, the wearable device may activate only some of electrodes included in the electrode pad.

In operation S1906, the wearable device may output the EMS signal to the determined electrode pad. The wearable device may determine an intensity, a pattern, a duration time, etc. of the EMS signal, and may output the EMS signal having the determined intensity and pattern to the electrode pad, during the determined duration time.

Figure 17:
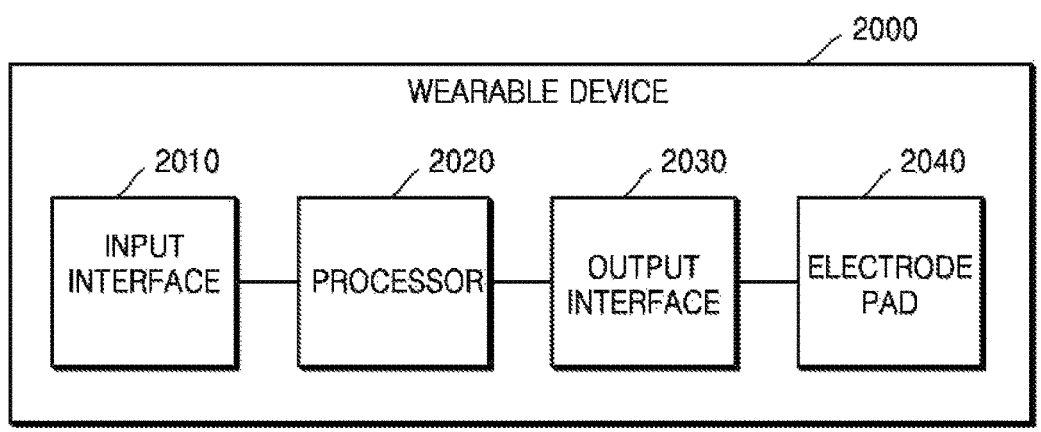
FIG. 17 is a block diagram of a wearable device according to an embodiment.

FIG. 17 is a block diagram of a wearable device 2000 according to an embodiment. Referring to FIG. 17, the wearable device 2000 may include an input interface 2010, a processor 2020, an output interface 2030, and an electrode pad 2040.

The input interface 2010 may detect a user motion by using sensors. The input interface 2010 may photograph a user motion or may measure a signal generated from muscles of a user. For example, the input interface 2010 may sense an EMG signal from an electrode located on a body of the user, and may detect the user motion by analyzing the body part from which the EMG signal is sensed and a pattern of the EMG signal.

The processor 2020 may determine a body part to which a feedback signal is to be transmitted, based on the user motion. The processor 2020 may determine the body part which was used by the user for a space input operation. Alternatively, the processor 2020 may compare a reference motion with the user motion received from the input interface 2010 to determine the body part to which the feedback signal is to be transmitted. The processor 2020 may output the feedback signal to muscles or a muscle fascicle connected to the determined body part so that the determined body part senses a repellant force.

The processor 2020 may calculate an error between the user motion and the reference motion and may control the output interface 2030 to output the feedback signal to the determined body part until the error becomes equal to or less than a threshold value.

The processor 2020 may determine an intensity, a direction, and a cycle of the feedback signal. The processor 2020 may determine the intensity, the direction, and the cycle of the feedback signal based on learning data stored for each user.

The output interface 2030 may transmit the feedback signal to the determined body part. The output interface 2030 may output an electrical signal for stimulating muscles in the determined body part, to the electrode pad 2040 located on the determined body part. For example, the output interface 2030 may generate an EMS signal and transmit the EMS signal to the body via the electrode pad 2040.

When the output interface 2030 outputs the feedback signal, the output interface 2030 may output power to a ground electrode around an electrode to which the feedback signal is output, in order to prevent the feedback signal from being emitted to other electrodes or other muscles.

The electrode pad 2040 may include at least one polygonal electrode pad and the ground electrode. The polygonal electrode pad may be arranged to be surrounded by the ground electrode. For example, the polygonal electrode pad may be hexagonal. However, the polygonal electrode pad may have various shapes.

The electrode pad 2040 may contact the body or may be located on the body. Also, the electrode pad 2040 may be attached in the clothing.

Figure 18:
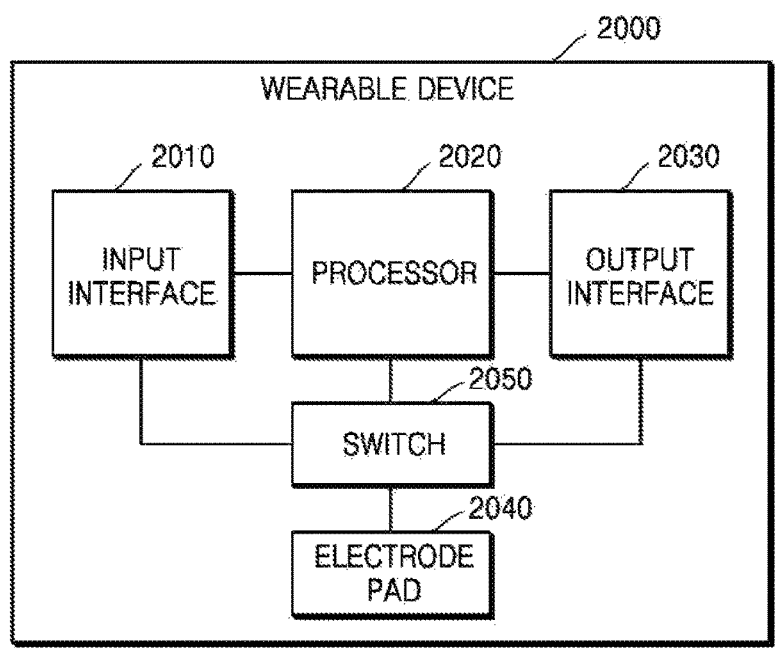
FIG. 18 is a block diagram of a wearable device according to another embodiment.

FIG. 18 is a block diagram of the wearable device 2000 according to another embodiment. Referring to FIG. 18, the electrode pad 2040 may be connected to the input interface 2010 and the output interface 2030 via a switch 2050.

When the electrode pad 2040 is connected to the input interface 2010, the input 210 may receive the EMG signal via the electrode pad 2040. When the electrode pad 2040 is connected to the output interface 2030, the output interface 2030 may output the EMS signal via the electrode pad 2040. Thus, the electrode pad 2040 may be used for both inputting and outputting the signal, and the input interface 2010 and the output interface 2030 may share the electrode pad 2040.

Figure 19:
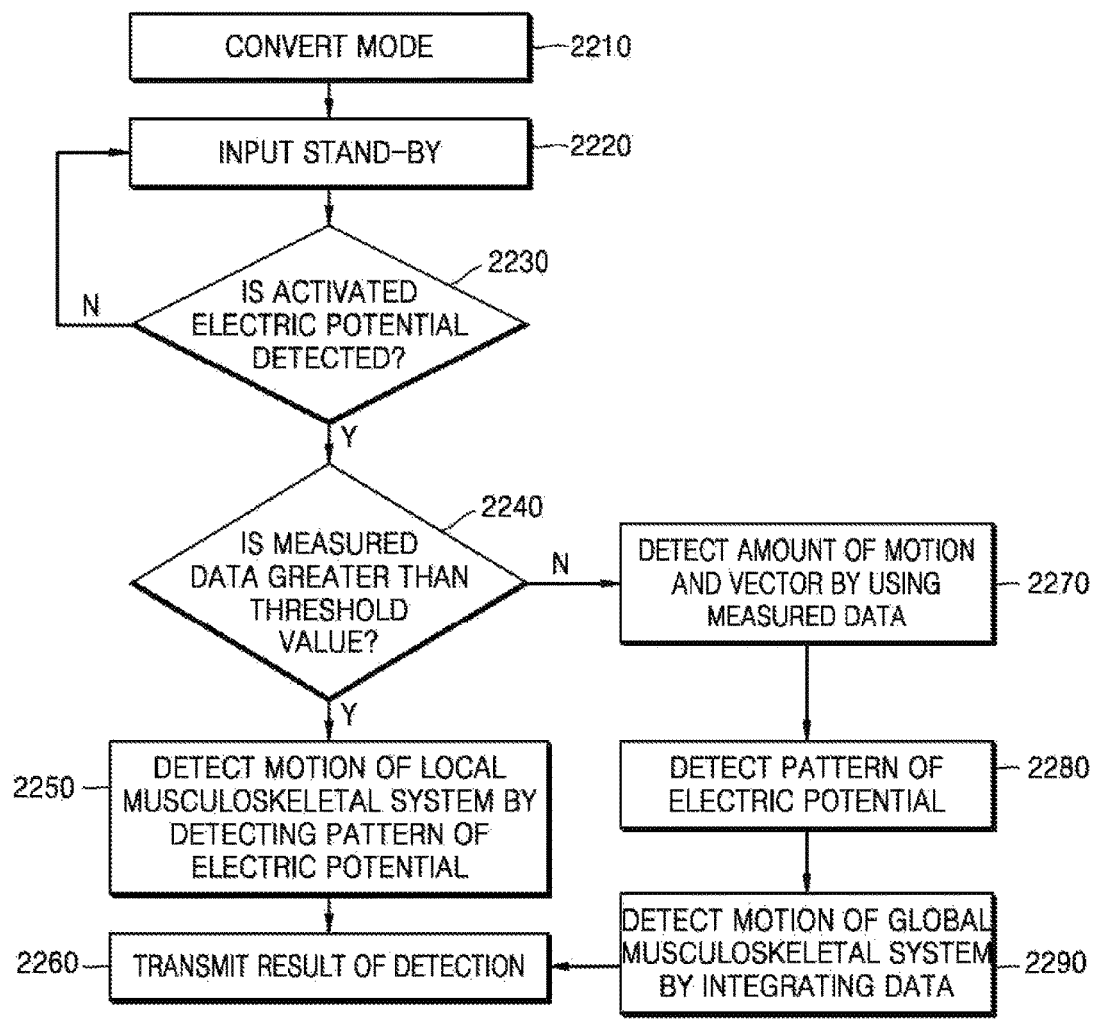
FIG. 19 is a flowchart of a method performed by a wearable device to detect an exercise of a musculoskeletal system by detecting an electric potential.

FIG. 19 is a flowchart of a method performed by the wearable device 2000 to detect motion of a musculoskeletal system by detecting an electric potential.

In operation S2210, a mode of the wearable device 2000 may be converted. The wearable device 2000 may convert the electrode pad 2040 to an input mode between the input mode and an output mode, so as to connect the input interface 2010 with the electrode pad 2040.

In operation S2220, the input interface 2010 may maintain a stand-by state until an electric potential is detected.

In operation S2230, the input interface 2010 may determine whether an activated electric potential is detected.

In operation S2240, the input interface 2010 may determine whether measured data is greater than a threshold value. In other words, the input interface 2010 may determine whether a measured electric potential is greater than the threshold value.

In operation S2250, the processor 2020 may detect motion of a local musculoskeletal system by detecting a pattern of the measured electric potential.

In operation S2270, the processor 2020 may detect the amount of motion and a vector by using the measured data.

In operation S2280, the processor 2020 may detect the pattern of the measured electric potential.

In operation S2290, the processor 2020 may detect motion of a global musculoskeletal system by integrating data. The processor 2020 may detect the motion of the overall musculoskeletal system by integrating the amount of motion, the vector, and the electric potential pattern.

In operation S2260, the wearable device 2000 may transmit a result of the detection to another device, such as the synchronized device 500. The wearable device 2000 may transmit results of detecting the motion of the local musculoskeletal system and detecting the motion of the global musculoskeletal system to another device.

It is described with reference to FIG. 19 that the wearable device 2000 transmits the result of the detection to another device. However, the wearable device 2000 may also receive measured data from another device and may use the result of the detection and the received measured data to detect the user motion.

The wearable device according to an embodiment may transmit a feedback signal to a body part which was used by a user for an input operation.

The wearable device according to an embodiment may transmit an electrical signal to a body part which was used by a user for a space input operation.

The wearable device according to an embodiment may transmit the electrical signal to the body part by comparing a user motion with a reference motion.

The device described herein may include a processor, a memory for storing program data and executing it, a permanent storage such as a disk drive, a communication port for handling communications with external devices, and user interface devices, such as a touch panel, a key, a button etc. Any processes may be implemented as software modules or algorithms, and may be stored as program instructions or computer readable codes executable by a processor on a computer-readable media such as magnetic storage mediums (e.g., read-only memory (ROM), random-access memory (RAM), floppy disks, hard disks, etc.), and optical data read devices (e.g., CD-ROM, digital versatile disc (DVD), etc.). The computer readable recording medium can also be distributed over network coupled computer systems so that the computer readable code is stored and executed in a distributed fashion. This media can be read by the computer, stored in the memory, and executed by the processor.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Furthermore, the present disclosure could employ any number of conventional techniques for electronics configuration, signal processing and/or control, data processing and the like. The words "mechanism," "element," "unit," and "component" are used broadly and is not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Use of the terms "a," "an," "the," and similar referents in the context of describing the disclosure (especially in the context of the following claims) is to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the present disclosure.

The invention claimed is:

1. A method performed by a wearable device to provide feedback, the method comprising:
    detecting a user motion;
    determining that the user motion includes an interaction with a user interface provided by an electronic device, the electronic device being connected to the wearable device;
    determining, based on the detected user motion and the interaction with the user interface, a body part to which a feedback signal is to be transmitted;
    generating the feedback signal; and
    outputting the feedback signal,
    wherein the feedback signal is an electrical signal to stimulate muscles of the body part.

2. The method of claim 1, wherein the outputting of the feedback signal comprises outputting the electrical signal to an electrode located on the body part.

3. The method of claim 1, wherein the determining of the body part comprises comparing the detected user motion with a reference motion.

4. The method of claim 3,
wherein the determining of the body part comprises calculating an error between the detected user motion and the reference motion, and
wherein the outputting of the feedback signal comprises outputting the feedback signal to reduce the error.

5. The method of claim 1, wherein the generating of the feedback signal comprises determining at least one of an intensity, a direction, or a cycle of the feedback signal.

6. The method of claim 5, wherein the at least one of the intensity, the direction, or the cycle of the feedback signal is determined based on learning data stored for the user.

7. The method of claim 1, wherein the detecting of the user motion comprises sensing an electromyographic (EMG) signal from an electrode located on the body part of the user, and analyzing the body part from which the EMG signal is sensed and a pattern of the EMG signal.

8. The method of claim 1, wherein the detecting of the user motion comprises detecting the user motion via a depth camera.

9. The method of claim 8, wherein the detecting of the user motion comprises detecting the user motion by using both motion detection data obtained via the depth camera and an electromyographic (EMG) signal sensed from an electrode located on the body part of the user.

10. The method of claim 1, wherein the outputting of the feedback signal comprises outputting the feedback signal to the muscles or a muscle fascicle connected to the body part.

11. The method of claim 1, wherein the outputting of the feedback signal comprises outputting the feedback signal via a first electrode and outputting a second signal to a ground electrode around the first electrode to maintain a ground state around the first electrode.

12. A wearable device comprising:
an electrode pad located on a body of a user;
an input interface configured to detect a motion of the user;
at least one processor configured to:
    determine that the user motion includes an interaction with a user interface provided by an electronic device, the electronic device being connected to the wearable device,
    determine, based on the detected motion of the user and the interaction with the user interface, a body part to which a feedback signal is to be transmitted, and
    generate the feedback signal; and
an output interface configured to output the feedback signal via the electrode pad located on the body part,
wherein the feedback signal is an electrical signal to stimulate muscles of the body part.

13. The wearable device of claim 12,
wherein the electrode pad comprises a plurality of electrodes,
wherein the at least one processor is further configured to determine an area of the electrode pad, the area corresponding to the body part, and
wherein the output interface is further configured to output the feedback signal to the electrodes in the area.

14. The wearable device of claim 13,
wherein the at least one processor is further configured to determine at least one of an intensity, a direction, or a cycle of the feedback signal output to the electrodes comprised in the area, and
wherein the output interface is further configured to output the feedback signal to the electrodes comprised in the area based on the at least one of the intensity, the direction, or the cycle of the feedback signal.

15. The wearable device of claim 12,
wherein the at least one processor is further configured to calculate an error between the detected motion of the user and a reference motion, and
wherein the output interface is further configured to output the feedback signal to reduce the error.

16. The wearable device of claim 12, wherein the at least one processor is further configured to determine at least one of an intensity, a direction, or a cycle of the feedback based on learning data stored for the user.

17. The wearable device of claim 12, wherein the electrode pad comprises at least one polygonal electrode pad and a ground electrode, the polygonal electrode pad being surrounded by the ground electrode.

18. The wearable device of claim 12, wherein the electrode pad is configured to receive an input and to output a signal.

19. The wearable device of claim 12, further comprising:
a switch configured to connect the sensor to the electrode pad or the output interface to the electrode pad,
wherein the switch is connected to the user interface or the output interface via the at least one processor.

20. A non-transitory computer-readable recording medium having embodied thereon a program for executing the method of claim 1.

* * * * *